(12) United States Patent
Al-Hooshani et al.

(10) Patent No.: US 10,494,575 B2
(45) Date of Patent: Dec. 3, 2019

(54) SULFUR ADSORBENT AND A METHOD OF SEPARATING SULFUR COMPOUNDS FROM A SULFUR-CONTAINING MIXTURE

(71) Applicant: King Fahd University of Petroleum and Minerals, Dhahran (SA)

(72) Inventors: Khalid Al-Hooshani, Dhahran (SA); Saheed A. Ganiyu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 30 days.

(21) Appl. No.: 15/938,579

(22) Filed: Mar. 28, 2018

(65) Prior Publication Data

US 2019/0300798 A1   Oct. 3, 2019

(51) Int. Cl.
| | |
|---|---|
| C10G 25/00 | (2006.01) |
| B01J 20/02 | (2006.01) |
| B01J 20/20 | (2006.01) |
| B01D 53/48 | (2006.01) |

(52) U.S. Cl.
CPC ............ *C10G 25/003* (2013.01); *B01D 53/48* (2013.01); *B01J 20/0248* (2013.01); *B01J 20/20* (2013.01); *B01D 2256/24* (2013.01); *B01D 2257/304* (2013.01); *B01D 2257/306* (2013.01); *C10G 2300/202* (2013.01); *C10G 2300/207* (2013.01)

(58) Field of Classification Search
CPC ............ C10G 25/003; C10G 2300/207; C10G 2300/202; B01D 53/48; B01D 2257/306; B01D 2257/304; B01D 2256/24; B01J 20/20; B01J 20/0248
See application file for complete search history.

(56) References Cited

U.S. PATENT DOCUMENTS

| | | | |
|---|---|---|---|
| 5,057,473 A | 10/1991 | Voecks et al. | |
| 5,843,300 A | 12/1998 | Zinnen et al. | |
| 6,254,766 B1 | 7/2001 | Sughrue et al. | |
| 6,454,935 B1 | 9/2002 | Lesieur et al. | |
| 6,531,053 B2 | 3/2003 | Khare | |
| 6,875,340 B2 | 4/2005 | Zong et al. | |
| 8,877,153 B2 | 11/2014 | Herskowitz et al. | |
| 9,421,516 B2 | 8/2016 | Alhooshani et al. | |

(Continued)

FOREIGN PATENT DOCUMENTS

| | | | |
|---|---|---|---|
| GB | 1413535 | * | 11/1972 |
| GB | 1413535 | * | 12/1975 |
| JP | 52-31977 | | 3/1977 |

OTHER PUBLICATIONS

Jun Xiong, et al., "Carbon-doped porous boron nitride: metal-free adsorbents for sulfur removal from fuels", Journals of Materials Chemistry A, vol. 3, 2015, pp. 12738-12747.

(Continued)

*Primary Examiner* — Randy Boyer
*Assistant Examiner* — Juan C Valencia
(74) *Attorney, Agent, or Firm* — Oblon, McClelland, Maier & Neustadt, L.L.P.

(57) ABSTRACT

A sulfur adsorbent comprising boric acid deposited on an activated carbon support, and a method of separating at least a portion of sulfur compounds from a sulfur-containing mixture with the sulfur adsorbent. Various combinations of embodiments of the sulfur adsorbent and the method are also provided.

18 Claims, 22 Drawing Sheets

(56) References Cited

U.S. PATENT DOCUMENTS 9,663,724 B2     5/2017    Alhooshani et al.
2004/0178117 A1   9/2004    Morton et al.

OTHER PUBLICATIONS

Jun Xiong, et al., "Boron Nitride Mesoporous Nanowires with Doped Oxygen Atoms for the Remarkable Adsorption Desulfurization Performance from Fuels", ACS Sustainable Chemistry & Engineering, vol. 4, No. 8, 2016, pp. 4457-4464.

Zhiyi Yan, et al., "Desulfurization of Model Oil by Selective Adsorption over Porous Boron Nitride Fibers with Tailored Microstructures", Scientific Reports, vol. 7, No. 3297, Jun. 12, 2017, pp. 1-8.

* cited by examiner

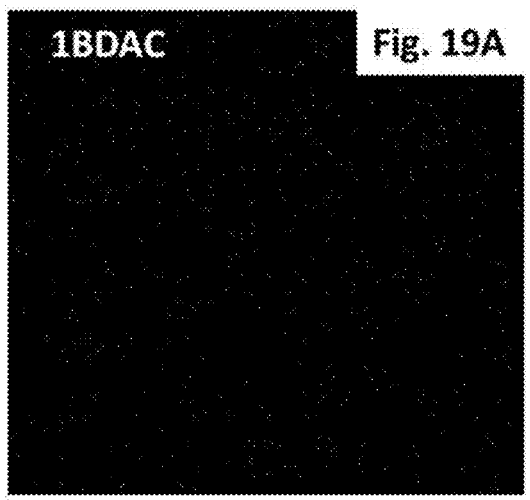
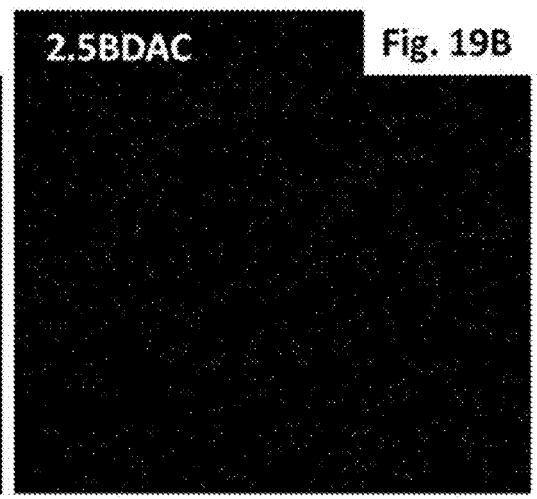
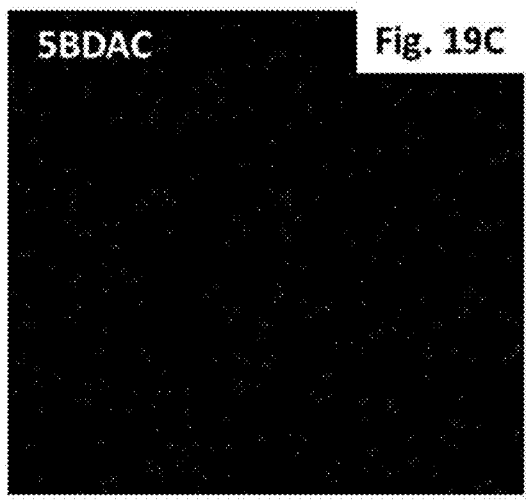
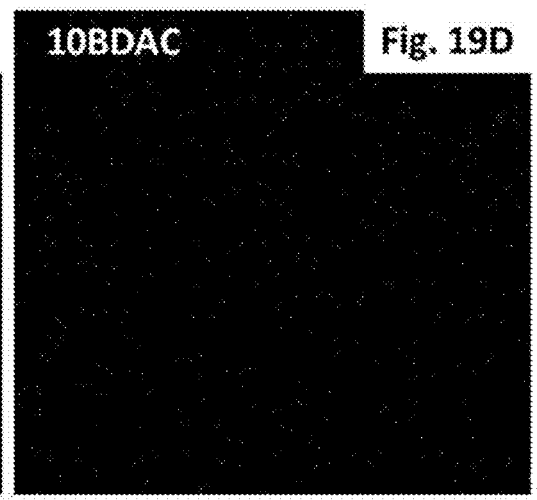

SULFUR ADSORBENT AND A METHOD OF SEPARATING SULFUR COMPOUNDS FROM A SULFUR-CONTAINING MIXTURE

STATEMENT OF FUNDING ACKNOWLEDGEMENT

The funding support provided by King Fahd University of Petroleum & Minerals under project no. DSR NUS 15105 is gratefully acknowledged.

STATEMENT REGARDING PRIOR DISCLOSURES BY THE INVENTOR OR A JOINT INVENTOR

Ganiyu et al., *Boron-doped activated carbon as efficient and selective adsorbent for ultra-deep desulfurization of 4,6-dimethyldibenzothiophene*. Chemical Engineering Journal, Volume 321, Aug. 1, 2017, Pages 651-661, which is incorporated herein by reference in its entirety.

BACKGROUND OF THE INVENTION

Technical Field

The present invention relates to a sulfur adsorbent comprising boric acid deposited on an activated carbon support, and a method of separating sulfur compounds from a sulfur-containing mixture with the sulfur adsorbent.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

According to environmental regulations relating to the quality and constituents of fuels, there is a push in research for developing a sulfur-free fuel. See J. H. Shan, L. Chen, L. B. Sun, X. Q. Liu, Adsorptive removal of thiophene by cu-modified mesoporous silica MCM-48 derived from direct synthesis, Energy Fuels (2011) 3093-3099; C. Ngamcharussrivichai, C. Chatratananon, S. Nuntang, P. Prasassarakich, Adsorptive removal of thiophene and benzothiophene over zeolites from Mae Moh coal fly ash, Fuel 87 (2008) 2347-2351. According to these regulations, the allowable sulfur content of transportation fuel was set to 15 ppm in the United States and 10 ppm in Brazil. See J. Bu, G. Loh, C. G. Gwie, S. Dewiyanti, M. Tasrif, A. Borgna, Desulfurization of diesel fuels by selective adsorption on activated carbons: competitive adsorption of polycyclic aromatic sulfur heterocycles and polycyclic aromatic hydrocarbons, Chem. Eng. J. 166 (2011) 207-217. A fuel with high sulfur content has several deleterious effects on the environment, for instance, the release of $SO_x$ from automobiles and the subsequent formation of acid rain which negatively impacts many ecosystems. See R. Neubauer, M. Husmann, C. Weinlaender, N. Kienzl, E. Leitner, C. Hochenauer, Acid base interaction and its influence on the adsorption kinetics and selectivity order of aromatic sulfur heterocycles adsorbing on Ag—$Al_2O_3$, Chem. Eng. J. 309 (2017) 840-849.

Current attempts to remove sulfur from fuels include hydrotreatment processes that are relatively efficient in removing thiols and sulfide compounds, but are not as efficient in removing thiophene compounds and derivatives thereof, particularly at low sulfur concentrations (e.g. less than 50 ppm). See J. H. Shan et al. On the downside, these processes require a significant amount of energy and pressure, thus leading to high operational costs. In view of that, alternative routes for efficient removal of sulfur from fuel have been investigated (e.g. via adsorptive and oxidative desulfurization processes) in order to find efficient processes for selectively removing recalcitrant sulfur-containing compounds, e.g. thiophene compounds, from fuel. Adsorptive desulfurization processes have proved to be more economical and efficient due to the mild operating conditions and feasibility of regenerating the adsorbent. In addition, the adsorptive desulfurization processes do not require the presence of hydrogen gas, and thus the operating cost of the desulfurization processes can be substantially reduced. See R. Neubauer, et al.; S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500.

An adsorption capacity of an adsorbent material that is used in the adsorptive desulfurization processes can substantially affect the efficiency of the process. The adsorption capacity is often correlated to some of the physicochemical properties of the adsorbent material, e.g. texture, structure, surface acidity, and morphology. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. A vast number of materials with these properties have already been evaluated and catalogued. Some of these materials include metals and metal oxides as well as microporous and mesoporous materials such as activated carbon (AC), alumina, zeolites, MCM-41, SBA-15, and MOFs. See Y. Wang, R. T. Yang, J. M. Heinzel, Desulfurization of jet fuel by π-complexation adsorption with metal halides supported on MCM-41 and SBA-15 mesoporous materials, Chem. Eng. Sci. 63 (2008) 356-365; F. Tian, Q. Shen, Z. Fu, Y. Wu, C. Jia, Enhanced adsorption desulfurization performance over hierarchically structured zeolite y, Fuel Process. Technol. 128 (2014) 176-182; N. A. Khan, S. H. Jhung, Adsorptive removal of benzothiophene using porous copper-benzenetricarboxylate loaded with phosphotungstic acid, Fuel Process. Technol. 100 (2012) 49-54; P. Jeevanandam, K. J. Klabunde, S. H. Tetzler, Adsorption of thiophenes out of hydrocarbons using metal impregnated nanocrystalline aluminum oxide, Microporous Mesoporous Mater. 79 (2005) 101-110; C. O. Ania, T. J. Bandosz, Importance of structural and chemical heterogeneity of activated carbon surfaces for adsorption of dibenzothiophene, Langmuir 21 (2005) 7752-7759. It was shown that by further doping the adsorbent's surface with a metal element such as Cu, Fe, Ni, Ce, Ag, or oxides thereof, composites with improved an adsorption capacity can be formed. See A. Mansouri, A. A. Khodadadi, Y. Mortazavi, Ultra-deep adsorptive desulfurization of a model diesel fuel on regenerable Ni—Cu/γ-$Al_2O_3$ at low temperatures in absence of hydrogen, J. Hazard. Mater. 271 (2014) 120-130; S. Nair, A. H. M. Shahadat Hussain, B. J. Tatarchuk, The role of surface acidity in adsorption of aromatic sulfur heterocycles from fuels, Fuel 105 (2013) 695-704; W. Dai, Y. Zhou, S. Li, W. Li, W. Su, Y. Sun, L. Zhou, Thiophene capture with complex adsorbent SBA-15/

Cu(I), Ind. Eng. Chem. Res. 45 (2006) 7892-7896; A. J. Hernández-Maldonado, F. H. Yang, G. Qi, R. T. Yang, Desulfurization of transportation fuels by p-complexation sorbents: Cu(I)-, Ni(II)-, and Zn(II)-zeolites, Appl. Catal. B Environ. 56 (2005) 111-126; A. J. Hernández-Maldonado, R. T. Yang, Desulfurization of liquid fuels by adsorption via p complexation with Cu(I)-Y and Ag—Y zeolites, Ind. Eng. Chem. Res. 42 (2003) 123-129; J.-H. Shan, X.-Q. Liu, L.-B. Sun, R. Cui, Cu—Ce bimetal ion-exchanged Y zeolites for selective adsorption of thiophenic sulfur, Energy Fuels 22 (2008) 3955-3959.

Activated carbon (AC) is a porous material with a large surface area and relatively large pore volume. AC-based adsorbents have also been investigated in adsorptive desulfurization processes. See Y. Shi, X. Zhang, G. Liu, Adsorptive desulfurization performances of ordered mesoporous carbons with tailored textural and surface properties, Fuel 158 (2015) 565-571. However, AC-based adsorbents need to be adjusted to be used efficiently in the adsorption of sulfur-containing compounds. For example, in one study, the surface acidity of the AC-based adsorbents was modified via oxidation, sulfidation, acidification, and steaming followed by incorporating metals and metal oxides onto the surface. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. Acidification of activated carbon materials, particularly with nitric acid, was shown to remove about 50% of inorganic components, yet increased the total micro-pore volume and formed carboxyl functional groups on the surface of the activated carbon materials. See C. Yu, X. Fan, L. Yu, T. J. Bandosz, Z. Zhao, J. Qiu, Adsorptive removal of thiophenic compounds from oils by activated carbon modified with concentrated nitric acid, Energy Fuels 27 (2013) 1499-1505; Y. Gokce, Z. Aktas, Nitric acid modification of activated carbon produced from waste tea and adsorption of methylene blue and phenol, Appl. Surf. Sci. 313 (2014) 352-359. The improved pore structures and surface acidity significantly affect the adsorbent's ability to remove bulky thiophenic compounds such as dibenzothiophene. See M. Seredych, J. Lison, U. Jans, T. J. Bandosz, Textural and chemical factors affecting adsorption capacity of activated carbon in highly efficient desulfurization of diesel fuel, Carbon N. Y. 47 (2009) 2491-2500. Additionally, oxidation of carbon materials offers oxygen-containing functional groups that are important for the adsorption of sulfur compounds. See J. Qiu, G. Wang, Y. Bao, D. Zeng, Y. Chen, Effect of oxidative modification of coal tar pitch-based mesoporous activated carbon on the adsorption of benzothiophene and dibenzothiophene, Fuel Process. Technol. 129 (2015) 85-90; Y. Shi, G. Liu, L. Wang, X. Zhang, Efficient adsorptive removal of dibenzothiophene from model fuel over heteroatom-doped porous carbons by carbonization of an organic salt, Chem. Eng. J. 259 (2015) 771-778. Furthermore, several reports addressed the effect of a dopant on the textural and surface acidity properties of the modified AC. S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. However, boron-doped AC has not been explored in adsorptive desulfurization processes.

In view of the forgoing, one objective of the present disclosure is to provide a method for separating at least a portion of sulfur compounds from a sulfur-containing mixture by contacting the sulfur-containing mixture with a sulfur adsorbent which includes boric acid deposited on an activated carbon support.

BRIEF SUMMARY OF THE INVENTION

According to a first aspect, the present disclosure relates to a method of separating at least a portion of one or more sulfur compounds from a sulfur-containing mixture, the method involving contacting the sulfur-containing mixture with a sulfur adsorbent to form a treated mixture, wherein the sulfur adsorbent comprises boric acid deposited on an activated carbon support.

In one embodiment, a weight ratio of the boric acid to the activated carbon support is in the range of 1:500 to 1:5.

In one embodiment, a weight ratio of the boric acid to the activated carbon support is in the range of 1:120 to 1:50.

In one embodiment, the activated carbon support has a BET surface area of 400 to 1,200 m$^2$/g.

In one embodiment, the boric acid is homogeneously deposited on the activated carbon support.

In one embodiment, the sulfur adsorbent has at least one of the following properties, a) an average pore size of 1.0 to 10.0 nm, b) a BET surface area of 200 to 1,000 m$^2$/g, c) a specific total pore volume of 0.3 to 1.0 cm$^3$/g, or d) a surface acidity of 0.8 to 1.8 mmol/g.

In one embodiment, an adsorption capacity of the sulfur adsorbent is up to 30.0 mg per gram of the sulfur adsorbent.

In one embodiment, the one or more sulfur compounds are selected from the group consisting of a sulfide, a disulfide, thiophene, an alkyl substituted thiophene, benzothiophene, an alkyl substituted benzothiophene, dibenzothiophene, and an alkyl substituted dibenzothiophene.

In one embodiment, a concentration of the one or more sulfur compounds in the sulfur-containing mixture ranges from 0.001% to 10% by weight relative to the total weight of the sulfur-containing mixture.

In one embodiment, the treated mixture comprises the one or more sulfur compounds, wherein a ratio of a concentration of the one or more sulfur compounds in the treated mixture to the concentration of the one or more sulfur compounds in the sulfur-containing mixture is 1:2 to 1:1,000.

In one embodiment, the contacting is carried out at a temperature of 10° C. to 40° C.

In one embodiment, the sulfur-containing mixture is contacted with the sulfur adsorbent for at least 2 minutes, but no more than 6 hours.

In one embodiment, the method further involves regenerating the sulfur adsorbent.

In one embodiment, the regenerating is carried out by treating the sulfur adsorbent with an organic solvent, wherein the organic solvent is at least one selected from the group consisting of acetone, methanol, toluene, benzene, and xylene.

In one embodiment, the sulfur adsorbent is regenerated for up to ten times, wherein an adsorption capacity of the sulfur adsorbent is reduced by no more than 10%, relative to an initial adsorption capacity of the sulfur adsorbent.

In one embodiment, the sulfur-containing mixture comprises one or more hydrocarbon compounds, wherein a selectivity of the sulfur adsorbent towards adsorbing the one or more sulfur compounds is at least 90% by mole.

According to a second aspect, the present disclosure relates to a sulfur adsorbent including boric acid deposited on an activated carbon support, wherein a weight ratio of the boric acid to the activated carbon support is in the range of 1:200 to 1:5.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 19A is an image of an EDS mapping of the sulfur adsorbent having 1.0 wt % of boric acid (i.e. 1BDAC).

FIG. 19B is an image of an EDS mapping of the sulfur adsorbent having 2.5 wt % of boric acid (i.e. 2.5BDAC).

FIG. 19C is an image of an EDS mapping of the sulfur adsorbent having 5.0 wt % of boric acid (i.e. 5BDAC).

FIG. 19D is an image of an EDS mapping of the sulfur adsorbent having 10.0 wt % of boric acid (i.e. 10BDAC).

DETAILED DESCRIPTION OF THE EMBODIMENTS

Figure 1:
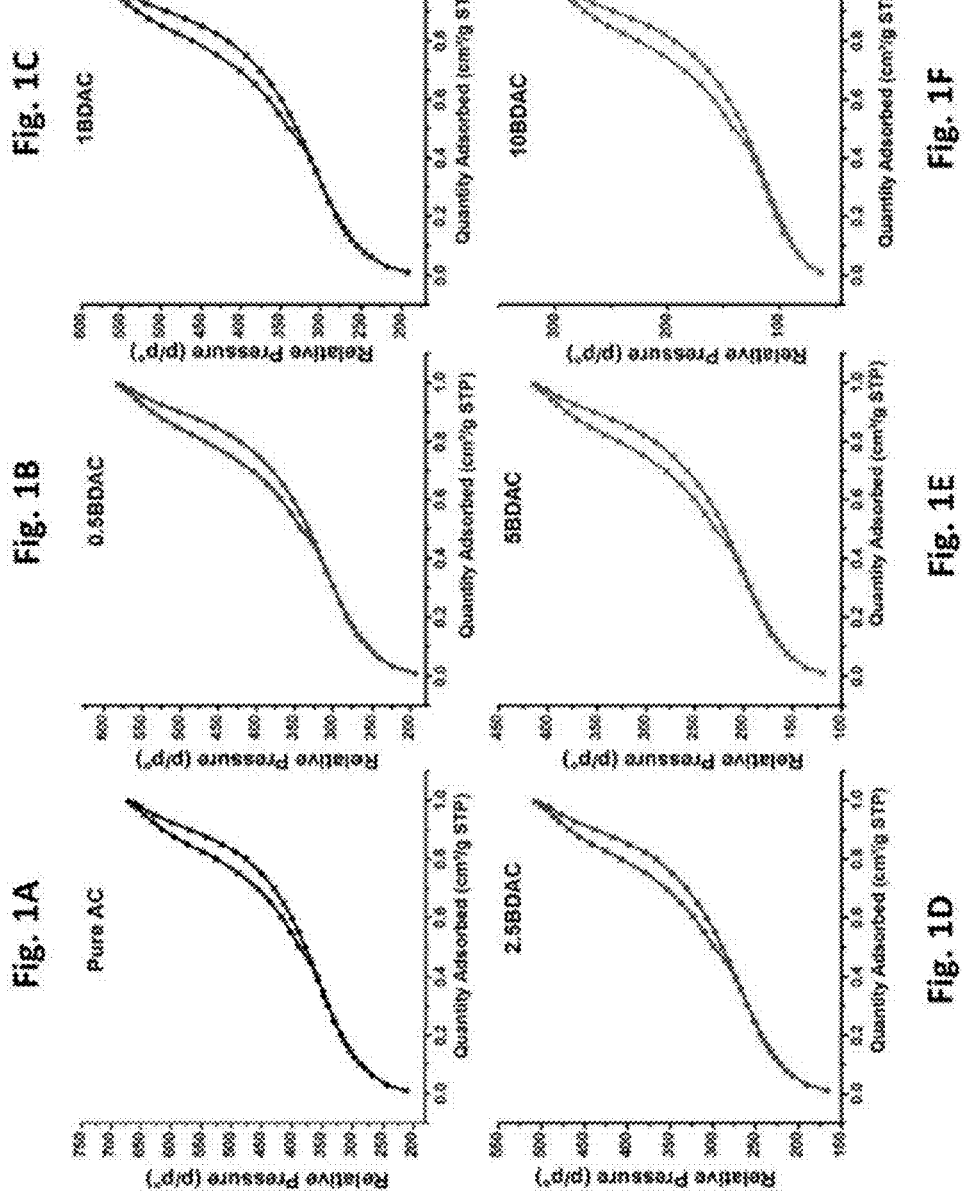
FIG. 1A represents an $N_2$-physisorption isotherm of activated carbon particles (i.e. Pure AC).
FIG. 1B represents an $N_2$-physisorption isotherm of a sulfur adsorbent having 0.5 wt % of boric acid relative to the total weight of the sulfur adsorbent (i.e. 0.5BDAC).
FIG. 1C represents an $N_2$-physisorption isotherm of a sulfur adsorbent having 1.0 wt % of boric acid relative to the total weight of the sulfur adsorbent (i.e. 1BDAC).
FIG. 1D represents an $N_2$-physisorption isotherm of a sulfur adsorbent having 2.5 wt % of boric acid relative to the total weight of the sulfur adsorbent (i.e. 2.5BDAC).
FIG. 1E represents an $N_2$-physisorption isotherm of a sulfur adsorbent having 5.0 wt % of boric acid relative to the total weight of the sulfur adsorbent (i.e. 5BDAC).
FIG. 1F represents an $N_2$-physisorption isotherm of a sulfur adsorbent having 10.0 wt % of boric acid relative to the total weight of the sulfur adsorbent (i.e. 10BDAC).

According to a first aspect, the present disclosure relates to a sulfur adsorbent. The term "sulfur adsorbent" as used in this disclosure relates to a composite material that is used for separating sulfur compounds from a sulfur-containing mixture. The sulfur adsorbent includes boric acid deposited on an activated carbon support.

The "boric acid" may preferably be present in a form of fine particles with an average diameter in the range of less than 5 µm, preferably less than 2 µm, preferably less than 1 µm, preferably in the range of 10 to 900 nm, preferably 50 to 800 nm, preferably 100 to 700 nm. A weight ratio of the boric acid to the activated carbon support in the sulfur adsorbent is 1:500 to 1:5, preferably 1:200 to 1:10, preferably 1:150 to 1:20, more preferably 1:120 to 1:50, even more preferably about 1:100.

In one embodiment, the boric acid is homogeneously deposited on the activated carbon support. The term "homogenously deposited" as used herein refers to an embodiment where a weight ratio of the boric acid to that of the activated carbon support in any given volume of the sulfur adsorbent is substantially the same as the specified weight ratio of the boric acid to the activated carbon support in the sulfur adsorbent. For example, in one embodiment, the boric acid is homogeneously deposited on the activated carbon support with a weight ratio of 1:100. Accordingly, the weight ratio of the boric acid to that of the activated carbon support in any given volume of the sulfur adsorbent is about 1:100.

The boric acid may be present on at least a portion of an external surface area of the activated carbon support. For example, in one embodiment, at least 20%, preferably at least 40%, preferably at least 60%, preferably 70% to 90%, preferably 75% to 85% of the external surface area of the activated carbon support is covered with the boric acid. SEM micrographs that are taken from an external surface area of the sulfur adsorbent, as shown in FIGS. 5B-5F, represent a deposition state of the boric acid on the activated carbon support. The boric acid may preferably have an irregular morphology; however in certain embodiments, the boric acid may have a spherical morphology, a flat-sheet morphology, a cubic morphology, a ring morphology, etc. In some embodiments, the activated carbon support has a crystalline phase with intra-crystalline pores and inter-crystalline pores, wherein the boric acid is deposited on the intra-crystalline pores or preferably on the inter-crystalline pores. A portion of the boric acid may be reduced and thus present on the activated carbon support in the form of elemental boron. A portion of the boric acid may be dehydrated and thus present on the activated carbon support as metaboric acid ($HBO_2$). A portion of the boric acid may be present in the form of boron trioxide ($B_2O_3$) in the activated carbon support. A still further portion of the boric acid may be in the form of at least one boron anionic compound selected from the group consisting of $B(OH)_4^-$, $BO(OH)_2^-$, $BO_2(OH)^{2-}$, and $BO_3^{3-}$.

The activated carbon support has a carbon content of at least 80% by weight, preferably at least 90% by weight, more preferably from about 95% to about 99% by weight, relative to the total weight of the activated carbon support. The activated carbon support may further contain metal, metalloid, and/or non-metal elements such as, without limitation, aluminum, magnesium, calcium, vanadium, nickel, copper, zinc, chromium, cobalt, lead, manganese, mercury, molybdenum, selenium, strontium, thallium, arsenic, beryllium, boron, cadmium, silicon and/or silica, sulfur, oxygen, etc. In certain embodiments, an oxygen content of the activated carbon support, when present, is no more than 10% by weight, preferably no more than 5% by weight, preferably no more than 2% by weight, preferably no more than 1% by weight, preferably in the range of 0.1% to 0.5% by weight. Additionally, a sulfur content of the activated carbon support, when present, is no more than 5% by weight, preferably no more than 2% by weight, preferably no more than 1% by weight, preferably in the range of 0.1% to 0.5% by weight. In some embodiments, the metal, metalloid, and/or non-metal elements, particularly aluminum, magnesium, calcium, vanadium, nickel, copper, zinc, and/or silicon, when present, constitutes 0.01-5.0% by weight of the activated carbon support, preferably 0.05-2.5% by weight, preferably 0.1-2.0% by weight, preferably 0.5-1.0% by weight. Each weight percentile is determined relative to the total weight of the activated carbon support.

In one embodiment, the activated carbon support has a Brunauer-Emmett-Teller (BET) surface area of at least 300 $m^2/g$, preferably in the range of 400 to 1,200 $m^2/g$, preferably 600 to 1,150 $m^2/g$, preferably 800 to 1,100 $m^2/g$. Additionally, the activated carbon support has a total pore volume of at least 0.2 $cm^3/g$, preferably at least 0.5 $cm^3/g$, preferably at least 0.7 $cm^3/g$, preferably in the range of 0.8 to 1.2 $cm^3/g$, preferably about 1.0 $cm^3/g$. The activated carbon support may have a BET surface area of less than 300 $m^2/g$, or in the range of 10 to 200 $m^2/g$, or 30 to 120 $m^2/g$, or 50 to 100 $m^2/g$, with a total pore volume of less than 0.3 $cm^3/g$, or less than 0.2 $cm^3/g$, or in the range of 0.05-0.2 $cm^3/g$. An average pore size in the activated carbon support may preferably be in the range of 10-100 Å, preferably 30-90 Å, more preferably 40-80 Å, even more preferably 50-70 Å.

A BET surface area of the sulfur adsorbent may vary in the range of 300 to 1,000 $m^2/g$, preferably 400 to 980 $m^2/g$, preferably 500 to 950 $m^2/g$. The BET surface area of the sulfur adsorbent may preferably be determined based on the BET surface area of the activated carbon support and the weight ratio of the boric acid to the activated carbon support. For example, in one embodiment, the BET surface area of the activated carbon support is in the range of about 900 to 1,200 $m^2/g$, preferably about 1,100 $m^2/g$, and the weight ratio of the boric acid to the activated carbon support is in the range of 1:120 to 1:50, preferably about 1:100, wherein the BET surface area of the sulfur adsorbent is in the range of 800 to 1,100 $m^2/g$, preferably 900 to 1,000 $m^2/g$, more preferably about 970 $m^2/g$. In one embodiment, average values of the BET surface area of the sulfur adsorbent are determined by the Brunauer, Emmet and Teller (BET) method, as known to those skilled in the art, and are listed in Table 1.

In some embodiments, the sulfur adsorbent includes micro-pores (i.e. pores with an average pore diameter of less than 2 nm, preferably in the range of 0.2 to 2 nm) with a total micro-pore volume of 0.01 to 0.3 $cm^3/g$, preferably 0.02 to 0.25 $cm^3/g$, preferably 0.03 to 0.2 $cm^3/g$. The sulfur adsorbent further includes meso-pores (i.e. pores with an average pore diameter of 2 to 50 nm, preferably 3 to 20 nm, preferably 4 to 10 nm) with a total meso-pore volume of 0.1 to 0.8 $cm^3/g$, preferably 0.3 to 0.75 $cm^3/g$, preferably 0.4 to 0.7 $cm^3/g$. Accordingly, a total pore volume (i.e. the total micro-pore volume plus the meso-pore volume) of the sulfur adsorbent may vary from about 0.1 to about 1.0 $cm^3/g$, preferably from about 0.3 to about 0.95 $cm^3/g$, preferably from about 0.4 to about 0.9 $cm^3/g$. The sulfur adsorbent may include macro-pores (i.e. pores with an average pore diameter of greater than 50 nm, preferably in the range of 50 to 100 nm, preferably 60 to 90 nm) with a total micro-pore volume of 0.1 to 0.4 $cm^3/g$, preferably 0.2 to 0.3 $cm^3/g$. In one embodiment, values of the pore size and the total pore volume of the sulfur adsorbent are measured by desorption part of Barret, Joyner and Halenda (BJH) method, as known to those skilled in the art, and results are shown in FIGS. 1A-1F, and average values of the pore size and the total pore volume of the sulfur adsorbent are listed in Table 1.

Figure 4:
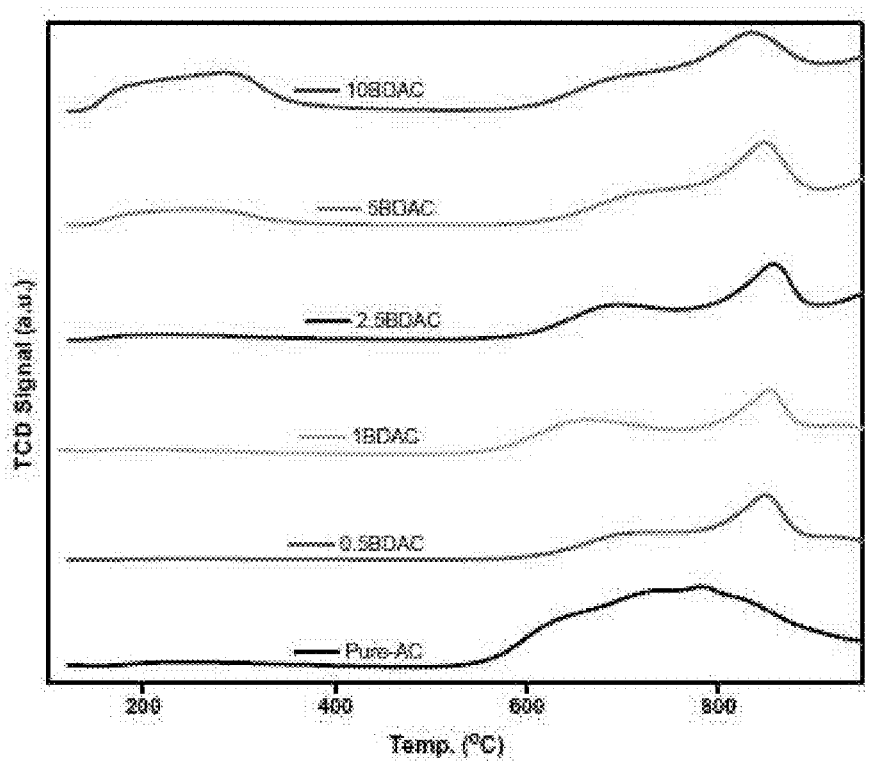
FIG. 4 represents $NH_3$-TPD (Temperature Programmed Desorption of ammonia) spectra of the activated carbon particles (i.e. Pure AC) and the sulfur adsorbents having various boric acid contents.

A surface acidity of the sulfur adsorbent may vary in the range from about 0.8 to about 1.8 mmol/g, preferably from about 0.9 to about 1.7 mmol/g, preferably from about 1.0 to about 1.6 mmol/g, preferably from about 1.05 to about 1.5 mmol/g. The surface acidity of the sulfur adsorbent may preferably be determined based on the surface acidity of the activated carbon support and the weight ratio of the boric acid to the activated carbon support. For example, in one embodiment, the surface acidity of the activated carbon support is in the range from about 0.6 to about 1.0 mmol/g, preferably from about 0.7 to about 0.8 mmol/g, and the weight ratio of the boric acid to the activated carbon support is in the range of 1:120 to 1:50, preferably about 1:100, wherein the surface acidity of the sulfur adsorbent is in the range from about 1.0 to about 1.5 mmol/g, preferably from about 1.2 to about 1.3 mmol/g. In one embodiment, values of the surface acidity of the sulfur adsorbent are determined by a temperature-programmed desorption of ammonia (TPD) method, as known to those skilled in the art, and results are shown in FIG. 4, and average values of the surface acidity of the sulfur adsorbent are also listed in Table 1.

The sulfur adsorbents can take a variety of geometries to facilitate separating sulfur compounds from the sulfur-containing mixture. Accordingly, the sulfur adsorbents may be in a form of a granule, a pellet, a sphere, powder, a fiber, a woven fabric, a non-woven fabric, a mat, a felt, a block, a honeycomb, etc. For example, in some embodiments, the sulfur adsorbent may be in a form of powder having fine particles with a diameter in the range of 50 μm to 1.0 mm, preferably 100 μm to 800 μm, more preferably 200 μm to 700 μm. In one embodiment, the sulfur adsorbent is an extrudate with a shape of, without limitation, a cylinder, a cone, a pyramid, a cube, etc.

An adsorption capacity (also referred to as an "adsorption performance" in this disclosure) of the sulfur adsorbent may be up to 10.0 mg (mg of sulfur compounds adsorbed per gram of the sulfur adsorbent), preferably up to 20 mg/g, preferably up to about 30 mg/g. The adsorption capacity of the sulfur adsorbent may preferably be determined based on the weight ratio of the boric acid to the activated carbon support. For example, in one embodiment, the weight ratio of the boric acid to the activated carbon support is in the range of 1:120 to 1:50, preferably about 1:100, wherein the adsorption capacity of the sulfur adsorbent is in the range of 5 to 30 mg/g, preferably 8 to 20 mg/g. In one embodiment, the adsorption capacity of the sulfur adsorbent is determined by equation (1) as shown below:

$$q_e = (C_o - C_e)\frac{V}{W} \quad (1)$$

wherein $C_o$ (mg/L) and $C_e$ (mg/L) represent an initial and an equilibrium concentration of sulfur compounds in a sulfur-containing mixture, respectively, V (L) is the volume of the sulfur-containing mixture, and w (g) is the weight of the sulfur adsorbent. In a preferred embodiment, the adsorption capacity of the sulfur adsorbent for separating 4,6-dimethyldibenzothiophene (DMDBT) is in the range of 5 to 30 mg/g, preferably 8 to 20 mg/g.

The sulfur adsorbent may adsorb various sulfur compounds from the sulfur-containing mixture. Non-limiting examples of the sulfur compounds may include mercaptans, sulfides, disulfides, polysulfides, thiols, thioethers, thioesters, thioacetals, sulfoxides, sulfones, thiosulfonates, sulfimides, sulfoximides, sulfonediimines, s-nitrosothiols, sulfur halides, thioketones, thioaldehydes, thiocarbonyls, sulfur oxides, thiocarboxylic acids, thioamides, sulfonic acid, sulfinic acid, sulfenic acids, sulfonium, oxosulfonium, sulfuranes, and persulfuranes. In a preferred embodiment, the sulfur adsorbent adsorbs at least one sulfur compound selected from the group consisting of thiophene, benzothiophene, dibenzothiophene, tetrahydrothiophene, an alkyl benzothiophene such as 5-methyl-1-benzothiophene, an alkyl dibenzothiophene such as 4-methyldibenzothiophene, and a dialkyl dibenzothiophene such as 4,6-dimethyldibenzothiophene. In some preferred embodiments, the sulfur adsorbent preferentially adsorbs 4,6-dimethyldibenzothiophene (DMDBT).

Figure 13:
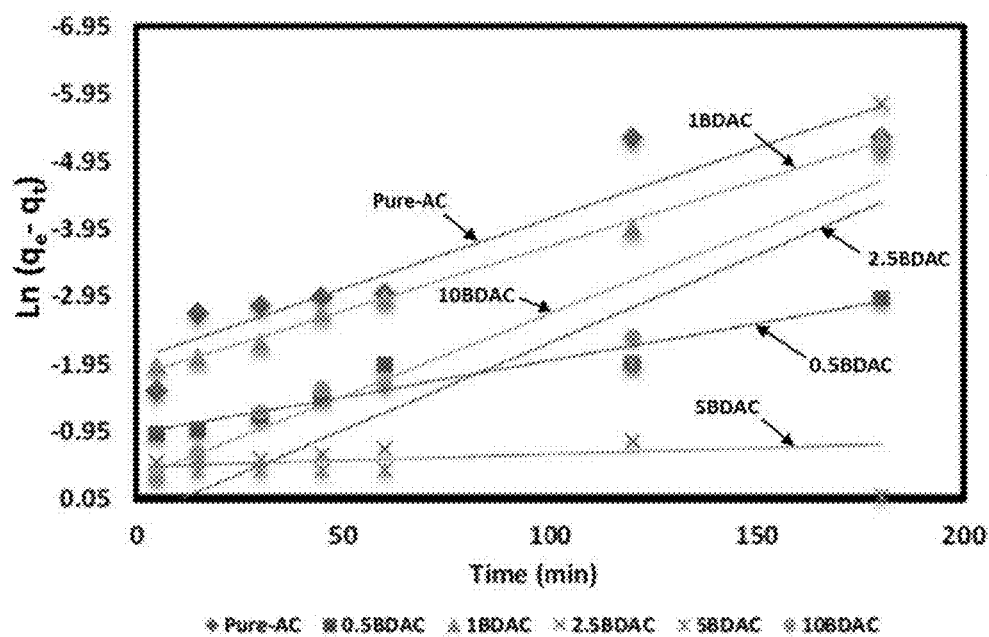
FIG. 13 represents a fitness of adsorption data of the sulfur adsorbents at various boric acid contents to a first-order adsorption kinetic model.
Figure 14:
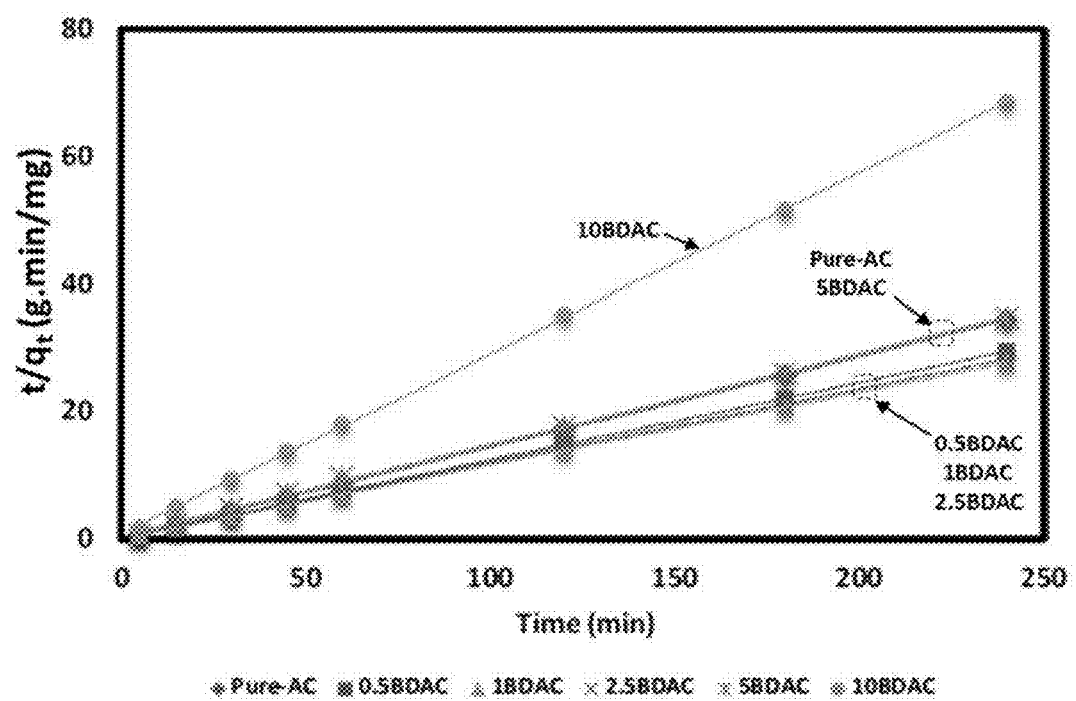
FIG. 14 represents a fitness of adsorption data of the sulfur adsorbents at various boric acid contents to a second-order adsorption kinetic model.

FIGS. 13 and 14 represent fitness of adsorption data of the sulfur adsorbents at various boric acid contents to a pseudo-first-order and a pseudo-second-order adsorption kinetic model, respectively. Accordingly, the sulfur adsorbent appears to follow a pseudo-second-order model, as shown in FIG. 14, which may imply that the sulfur adsorbent may effectively adsorb the sulfur compounds throughout an entire adsorptive desulfurization process. Also, according to FIG. 15, the sulfur adsorbent appears to follow an intra-particle diffusion model, which may imply that an intra-particle diffusion phenomenon is not a rate controlling step of adsorption.

Figure 16:
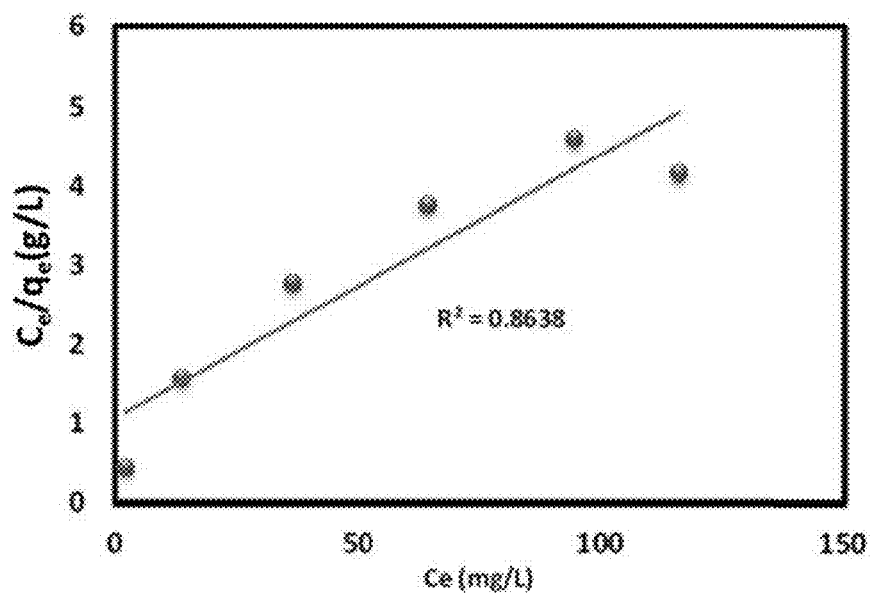
FIG. 16 represents a fitness of adsorption data to the Langmuir model.
Figure 17:
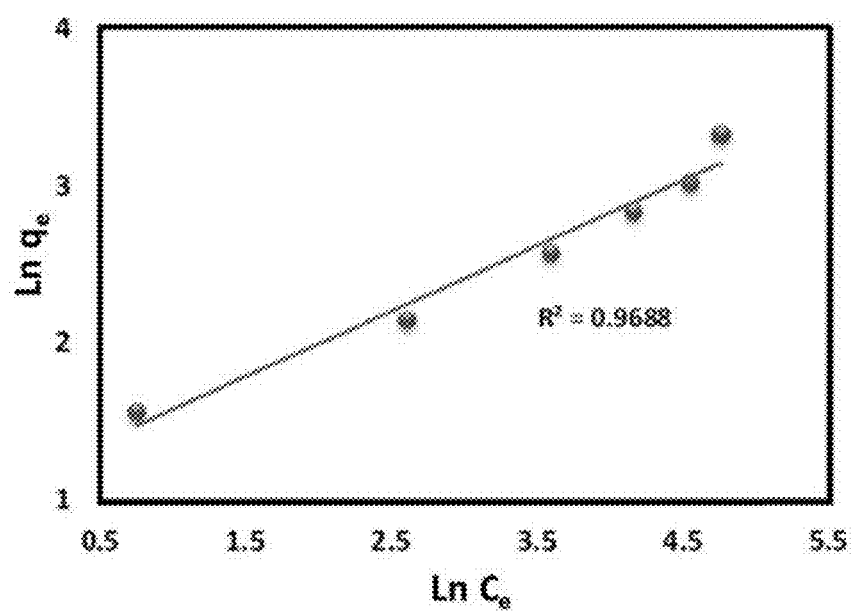
FIG. 17 represents a fitness of adsorption data to the Freundlich model.

FIGS. 16 and 17 represent fitness of adsorption isotherms of the sulfur adsorbent to the Langmuir and the Freundlich models, respectively. Accordingly, the sulfur adsorbent appears to follow the Freundlich model, as shown in FIG. 17, which may imply that the boric acid is compatible with the activated carbon support.

One aspect of the present disclosure relates to a method of manufacturing the sulfur adsorbent. Accordingly, in a first step activated carbon particles may be subjected to a pre-treatment step such as drying and/or dry-sieving with a 35-400 mesh, preferably 50-350 mesh, preferably 100-300 mesh.

The activated carbon particles may then be mixed with an acid solution to a final concentration of 10-100 g/L (g of activated carbon particles per volume of acid solution), preferably 15-75 g/L, more preferably 25-50 g/L, and stirred. The activated carbon particles may be refluxed at a temperature of 100-150° C., preferably 115-135° C. for 3-6 hours or until sufficiently treated with the acid solution. The acid solution contains one or more inorganic or mineral acids selected from nitric acid, sulfuric acid, phosphoric acid, perchloric acid, hydrobromic acid, hydrochloric acid, hydroiodic acid, hydrofluoric acid, and boric acid. For example, in one embodiment, the acid solution contains 20% by volume of sulfuric acid, 40% by volume of nitric acid, and 40% by volume of phosphoric acid. In some other embodiments, the acid solution contains 100 vol. % of phosphoric acid; 40 vol. % of nitric acid and 60 vol. % of phosphoric acid; 100 vol. % of nitric acid; 40 vol. % of sulfuric acid and 60 vol. % of phosphoric acid; 40 vol. % of sulfuric acid, 20 vol. % of nitric acid and 40 vol. % of phosphoric acid; or 100 vol. % of sulfuric acid. In alternative embodiments, one or more organic acids may be used to prepare the acid solution. Examples of organic acids include but are not limited to formic acid, acetic acid, propionic acid, butyric acid, valeic acid, caproic acid, oxalic acid, lactic acid, malic acid, citric acid, carbonic acid, benzoic acid, phenol, uric acid, carboxylic acids, and sulfonic acid. In another embodiment, the acid solution may contain mixtures of mineral and organic acids. Acid-treating the activated carbon particles may preferably form carboxylic functional groups on a surface of the activated carbon particles. Acid-treating the activated carbon particles may further form one or more oxygen functional groups such as e.g., hydroxyl, carbonyl, aldehyde, etc. on a surface of the activated carbon particles. In addition, acid-treating the activated carbon particles may remove a portion of organic and/or inorganic compounds present in the activated carbon particles, thus may increase the total pore volume of the activated carbon particles.

Figure 3:
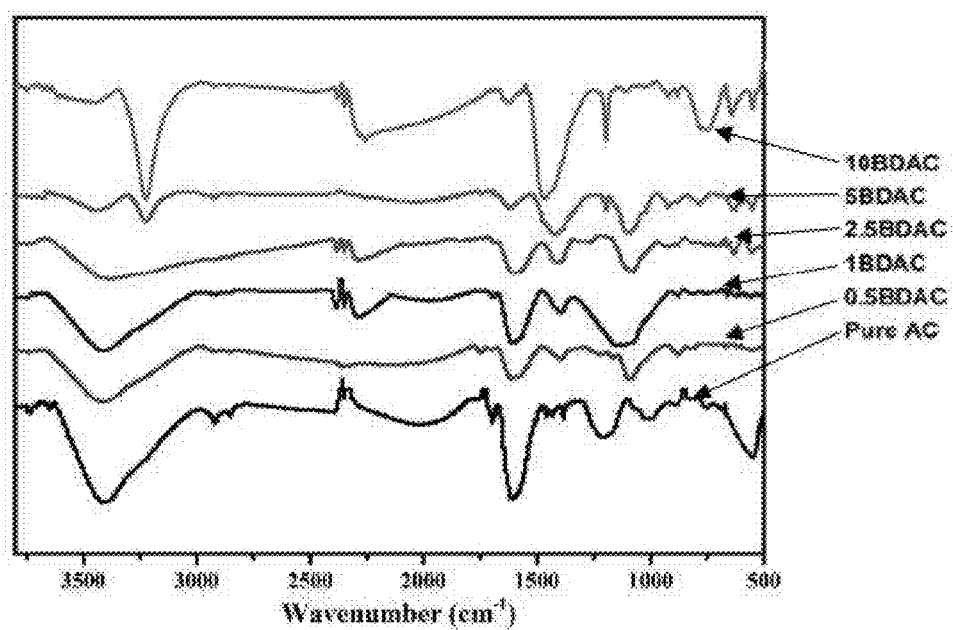
FIG. 3 represents FTIR spectra of the activated carbon particles (i.e. Pure AC) and the sulfur adsorbents having various boric acid contents.

In some embodiments, the activated carbon particles may be treated in an ammonia solution or an ammonium hydroxide solution, preferably after an acid-treatment, to form amine functional groups on the surface of the activated carbon particles. In one embodiments, the type of functional groups and a surface concentration of the functional groups attached to the surface of the activated carbon particles and the sulfur adsorbent are determined by Fourier-Transform Infrared Spectroscopy (FTIR), as shown in FIG. 3.

Figure 5:
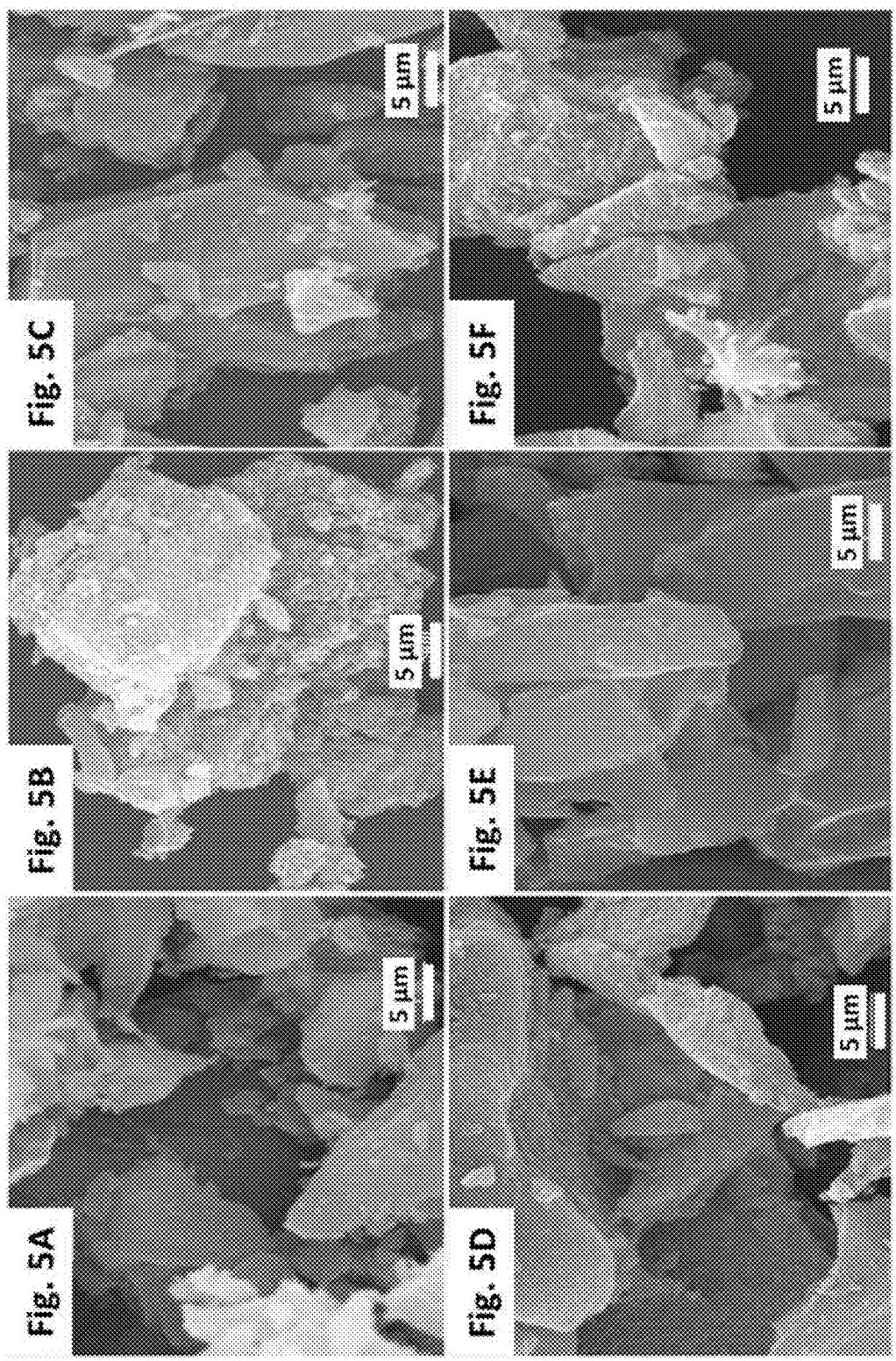
FIG. 5A represents an SEM micrograph of the activated carbon particles (i.e. Pure AC).
FIG. 5B represents an SEM micrograph of the sulfur adsorbent having 0.5 wt % of boric acid (i.e. 0.5BDAC).
FIG. 5C represents an SEM micrograph of the sulfur adsorbent having 1.0 wt % of boric acid (i.e. 1BDAC).
FIG. 5D represents an SEM micrograph of the sulfur adsorbent having 2.5 wt % of boric acid (i.e. 2.5BDAC).
FIG. 5E represents an SEM micrograph of the sulfur adsorbent having 5.0 wt % of boric acid (i.e. 5BDAC).
FIG. 5F represents an SEM micrograph of the sulfur adsorbent having 10.0 wt % of boric acid (i.e. 10BDAC).

The activated carbon particles may be washed with deionized water, filtered, and then dried. FIG. 5A shows an SEM micrograph of the activated carbon particles.

In a next step, a boric acid solution is prepared by mixing the boric acid with water, preferably deionized water having a conductivity of about 15 µS/cm to about 20 µS/cm, more preferably about 18 µS/cm. In certain embodiments, the boric acid solution is prepared by mixing the boric acid with an organic solvent such as acetone, methanol, ethanol, and/or pyridine. Once the boric acid solution is prepared, the activated carbon particles are mixed with the boric acid solution, and the mixture is isothermally heated at a temperature of 50 to 70° C., preferably 55 to 65° C., for 8 to 24 hours, preferably 10 to 14 hours to slowly evaporate the water and/or the organic solvent present in the mixture, and to form the sulfur adsorbent. Slow evaporation of water or the organic solvent may be preferred due to a better dispersion of the boric acid on the activated carbon particles, i.e. a homogeneously deposition of the boric acid on the activated carbon particles. A homogeneous dispersion of the boric acid on the activated carbon particles are evident in the SEM micrographs taken from the surface of the sulfur adsorbent, as shown in FIGS. 5B-5F. In some preferred embodiments, the sulfur adsorbent may be isothermally heated at a temperature of 80 to 120° C., preferably 100 to 110° C. and in a vacuum oven, for 2 to 10 hours, preferably 4 to 8 hours; and further calcined at a temperature of 500 to 650° C., preferably 580 to 620° C. for 1 to 4 hours, preferably 2 to 3 hours, under a flow of nitrogen gas.

Since the sulfur adsorbent includes boric acid in lieu of expensive metal elements such as, Ag, Au, Pt, etc., in one embodiment, a manufacturing cost of the sulfur adsorbent is at least 20%, preferably at least 50%, preferably at least 80%, lower than the manufacturing cost of an sulfur adsorbent that includes metal elements such as, Ag, Au, Pt, doped on activated carbon materials.

In some circumstances, a complexing agent may be utilized to provide stable complexes of the boric acid with the activated carbon support, so to increase a durability of the sulfur adsorbent. The complexing agent may also provide a good dispersion of the boric acid on the activated carbon support. Exemplary complexing agents that may be used include, without limitation, nitrileacetic adireccid, cyclohexanediamine tetraacetic acid, tris(2-aminoethyl) amine, triethylenetetraamine, diethylenetriaminepentaacetic acid, ethyleneglycol-bis-(beta-aminoethylether)-N,N'-tetraacetic acid, tetraethylenepentaamine, citric acid, ethylenediaminetetraacetic acid (EDTA) and derivatives thereof such as N-hydroxy ethylenediaminetetraacetic acid or diammonium ethylenediaminetetraacetic acid.

According to a second aspect, the present disclosure relates to a method of separating one or more sulfur compounds from a sulfur-containing mixture by contacting the sulfur-containing mixture with the sulfur adsorbent.

In some embodiments, the sulfur-containing mixture may be a hydrocarbon feedstock, which is delivered from a hydrocarbon reservoir or directly from an offshore or an onshore well. For example, the sulfur-containing mixture may be a crude oil stream that is produced and delivered from a sweet/sour oil reservoir. Non-limiting examples of the sulfur-containing mixture include sour crude oil, sweet crude oil, gasoline, naphtha, diesel, or any liquid stream in a petrochemical plant that needs to be desulfurized. In some embodiments, the sulfur-containing mixture is a hydrocarbon mixture that may be in a gaseous state that is supplied directly from an offshore or an onshore well.

The sulfur-containing mixture may include one or more sulfur compounds such as mercaptans, sulfides, disulfides, polysulfides, thiols, thioethers, thioesters, thioacetals, sulfoxides, sulfones, thiosulfonates, sulfimides, sulfoximines, sulfonediimines, s-nitrosothiols, sulfur halides, thioketones, thioaldehydes, thiocarbonyls, sulfur oxides, thiocarboxylic acids, thioamides, sulfonic acid, sulfinic acid, sulfenic acids, sulfonium, oxosulfonium, sulfuranes, and persulfuranes. In one embodiment, the sulfur-containing mixture may preferably include at least one of thiophene, benzothiophene, dibenzothiophene, tetrahydrothiophene, an alkyl benzothiophene such as 5-methyl-1-benzothiophene, an alkyl dibenzothiophene such as 4-methyldibenzothiophene, and a dialkyl dibenzothiophene such as 4,6-dimethyldibenzothiophene (DMDBT). The sulfur-containing mixture may further include various hydrocarbon compounds with a carbon content ranging from $C_{1-50}$, preferably $C_{1-30}$, preferably $C_{1-20}$. For example, in one embodiment, the sulfur-containing mixture includes $C_{1-20}$ normal paraffins, e.g. $C_{1-20}$ alkanes, $C_{1-20}$ isoparaffins, $C_{1-20}$ cycloparaffins (i.e. naphthenes) or $C_{1-20}$ cycloparaffins having side chain alkyl groups, $C_{1-20}$ aromatics or $C_{1-20}$ aromatics having side chain alkyl groups. In some embodiments, the sulfur-containing mixture is in a gaseous state and contains one or more of methane, ethane, nitrogen, carbon dioxide, hydrogen sulfide, carbon monoxide, water vapor, and may further include traces amount (preferably less than 0.1 vol. %) of argon, helium, and nitrogen oxides (i.e. nitric oxide, nitrous oxide, nitrogen dioxide), etc. In one embodiment, the sulfur-containing mixture is a sour gas stream, which is produced from a sour gas reservoir.

In one embodiment, a concentration of the sulfur compounds present in the sulfur-containing mixture ranges from about 0.001 wt % to about 10 wt % (i.e. about 10 ppm to about 100,000 ppm), preferably from about 0.005 wt % to about 1.0 wt % (i.e. about 50 ppm to about 10,000 ppm), preferably from about 0.008 wt % to about 0.5 wt % (i.e. about 80 ppm to about 5,000 ppm), preferably 0.01 wt % to 0.1 wt % (i.e. about 100 ppm to about 1,000 ppm), preferably 0.02 wt % to 0.05 wt % (i.e. about 200 ppm to about 300 ppm), wherein each weight percentile is relative to the total weight of the sulfur-containing mixture. In one embodiment, a concentration of the sulfur compounds in the sulfur-containing mixture is no more than 50,000 ppm, preferably no more than 20,000 ppm, preferably no more than 10,000 ppm, preferably no more than 5,000 ppm, preferably no more than 2,000 ppm, preferably no more than 1,000, preferably in the range of 100 to 800 ppm, preferably 200 to 500 ppm.

The concentration of the sulfur compounds in the sulfur-containing mixture may be reduced by at least 10%, preferably at least 20%, preferably at least 30%, preferably at least 50%, preferably at least 60%, preferably by about 70% to about 99%, more preferably by about 75% to about 90%, after contacting the sulfur-containing mixture with the sulfur adsorbent.

Accordingly, a treated mixture (i.e. a product mixture that is produced after contacting the sulfur-containing mixture with the sulfur adsorbent) is formed after contacting the sulfur-containing mixture with the sulfur adsorbent. In a preferred embodiment, the treated mixture is substantially free from the sulfur compounds (i.e. a concentration of the sulfur compounds is less than 50 ppm, preferably less than 10 ppm, preferably less than 5 ppm). In some other embodiments, a ratio of the concentration of the sulfur compounds in the treated mixture to the concentration of the sulfur compounds in the sulfur-containing mixture is in the range of 1:2 to 1:1,000, preferably 1:10 to 1:900, preferably 1:50 to 1:800, preferably 1:100 to 1:700. Accordingly, the treated mixture may preferably contain up to 10,000 ppm, preferably no more than 5,000 ppm, preferably no more than 2,000 ppm, preferably no more than 1,000 ppm, preferably no more than 500 ppm, preferably no more than 200 ppm, preferably no more than 100 ppm, preferably no more than 50 ppm, preferably no more than 10 ppm, preferably no more than 5 ppm of sulfur compounds.

The sulfur adsorbent may preferably adsorb bulky thiophene compounds such as alkyl benzothiophenes, e.g. 5-methyl-1-benzothiophene, alkyl dibenzothiophenes, e.g. 4-methyldibenzothiophene, dialkyl dibenzothiophenes, e.g. 4,6-dimethyldibenzothiophene (DMDBT), etc. For example, in a preferred embodiment, the sulfur-containing mixture include 4,6-dimethyldibenzothiophene (DMDBT), wherein a ratio of the concentration of the DMDBT in the treated mixture to the concentration of the DMDBT in the sulfur-containing mixture is in the range of 1:50 to 1:1,000, preferably 1:100 to 1:900, preferably 1:150 to 1:800.

The sulfur-containing mixture is contacted with the sulfur adsorbent under conditions that are favorable for adsorbing the sulfur compounds. For example, in a preferred embodiment, the sulfur-containing mixture is contacted with the sulfur adsorbent at a temperature of 10° C. to 40° C., preferably 15° C. to 35° C., preferably 20° C. to 30° C., and preferably at a pressure of 0.1 to 5 atm, preferably 0.5 to 3 atm, preferably 0.8 to 1.2 atm, more preferably about 1 atm. In the embodiments where the sulfur-containing mixture is a hydrocarbon feedstock which is directly supplied from a hydrocarbon reservoir, an offshore platform, or an onshore platform, the temperature and/or the pressure of the hydrocarbon feedstock may first be regulated to be within the aforementioned ranges prior to contacting the sulfur-containing mixture with the sulfur adsorbent. According to the aforementioned conditions favorable for adsorbing the sulfur compounds, an operational cost of an adsorptive desulfurization process using the sulfur adsorbent is at least 50%, preferably at least 80%, preferably at least 100%, or preferably 120% to 180% lower than the operational cost of hydrodesulfurization processes using hydrodesulfurization catalysts. In addition, an operational cost of an adsorptive desulfurization process using the sulfur adsorbent may be at least 20%, preferably at least 50%, preferably at least 80%, or preferably 100% to 120% lower than the operational cost of adsorptive desulfurization processes that use sulfur adsorbents having Cu, Fe, Ni, Ce, and/or Ag doped on activated carbon materials.

The sulfur-containing mixture may be contacted with the sulfur adsorbent using different protocols, as known to those skilled in the art, depending on the state of the sulfur-containing mixture. For example, in a preferred embodiment, the sulfur-containing mixture is in a liquid state or in a gaseous state and the sulfur-containing mixture is passed through the sulfur adsorbent, for example, using a fixed-bed or a fluidized-bed adsorber, as known to those skilled in the art. In one embodiment, the sulfur-containing mixture is in a liquid state, wherein the sulfur-containing mixture is mixed with the sulfur adsorbent and stirred, for example using a batch adsorber equipped with a rotary stirrer, and the sulfur adsorbent is further filtered to recover the treated mixture. In another embodiment, the sulfur-containing mixture is in a gaseous state and the sulfur-containing mixture is passed over the sulfur adsorbent, or it may stay stagnant over the sulfur adsorbent.

In certain embodiments, the sulfur-containing mixture may be contacted with the sulfur adsorbent for more than one cycle to form a double/triple/multiple treated mixture with substantially reduced concentrations of sulfur compounds. Accordingly, in one embodiment, the treated mixture is circulated and contacted with the sulfur adsorbent for at least two cycles, preferably at least five cycles, but preferably no more than ten cycles. In some embodiments, the sulfur-containing mixture may be contacted with the sulfur adsorbent for more than one cycle with a cascade of fixed-bed and/or fluidized-bed absorbers to form the treated mixture.

The sulfur-containing mixture is contacted with the sulfur adsorbent for at least 2 minutes, but no more than 6 hours. For example, in some embodiments, the sulfur-containing mixture is contacted with the sulfur adsorbent for 2 to 20 minutes, preferably 3 to 18 minutes, preferably 4 to 15 minutes, preferably 5 to 10 minutes. In another embodiment, the sulfur-containing mixture is contacted with the sulfur adsorbent for 0.5 to 6 hours, preferably 1 to 5.5 hours, preferably 3 to 5 hours, preferably about 4 hours.

Figure 11:
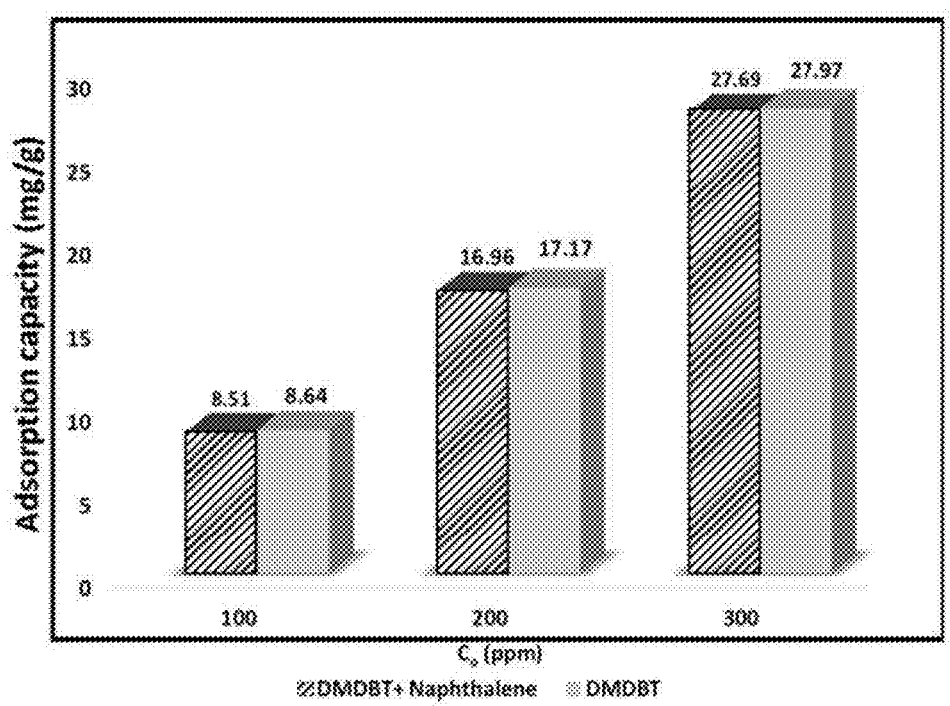
FIG. 11 represents a comparison of the amount of sulfur compounds adsorbed on the 1BDAC in the presence of a sulfur-containing mixture that contains a) 4,6-dimethyldibenzothiophene (DMDBT), b) 4,6-dimethyldibenzothiophene (DMDBT)+naphthalene.

A selectivity of the sulfur adsorbent towards adsorbing the sulfur compounds may be at least 90% by mole, preferably at least 92% by mole, preferably at least 95% by mole, more preferably in the range from about 96% to 99% by mole. In one embodiment, the term "selectivity" as used herein refers to an ability of the sulfur adsorbent to adsorb the sulfur compounds in the presence of other compounds, e.g. hydrocarbon compounds. Accordingly, the selectivity of the sulfur adsorbent is quantified by measuring a ratio of the total mole of the sulfur compounds adsorbed by the sulfur adsorbent to the total mole of compounds or sulfur compounds adsorbed. For example, in one embodiment, the sulfur-containing mixture contains one or more of the sulfur compounds, and at least one of $C_{6-20}$ aromatics or $C_{7-30}$ aromatics having one or more side chain alkyl groups, wherein the selectivity of the sulfur adsorbent towards adsorbing the sulfur compounds may be at least 90% by mole, preferably in the range from about 96% to 99% by mole. In a particular embodiment, the sulfur-containing mixture contains one or more of the sulfur compounds and naphthalene, wherein the selectivity of the sulfur adsorbent towards adsorbing the sulfur compounds may be at least 90% by mole, preferably in the range from about 96% to 99% by mole, as shown in FIG. 11.

In some preferred embodiments, the selectivity of the sulfur adsorbent towards adsorbing bulky thiophene compounds such as alkyl benzothiophenes, e.g. 5-methyl-1-benzothiophene, alkyl dibenzothiophenes, e.g. 4-methyldibenzothiophenes, dialkyl dibenzothiophenes, e.g. 4,6-dimethyldibenzothiophene (DMDBT), etc. is at least 90% by mole, preferably 95-99% by mole, more preferably 96-98% by mole.

In one embodiment, the method further involves regenerating the sulfur adsorbent to separate at least a portion of the sulfur compounds that are adsorbed onto the surface of the sulfur adsorbent, in order to recycle the sulfur adsorbent. Accordingly, in some embodiments, the sulfur adsorbent is treated with an organic solvent to remove/separate impurities, particularly sulfur compounds, from the surface of the sulfur adsorbent. Accordingly, the sulfur adsorbent may be mixed with the organic solvent with a ratio of 1 gram of the sulfur adsorbent per 20 to 50 ml, preferably 30 ml of the organic solvent, and may further be stirred for at least 30 minutes, preferably 40 to 240 minutes, preferably 50 to 100 minutes, preferably about 60 minutes, at a temperature of 40° C. to 80° C., preferably 50° C. to 70° C., preferably about 60° C. After that, the sulfur adsorbent may be dried at a temperature of 80 to 120° C., preferably 100 to 110° C. and in a vacuum oven, for 6 to 14 hours, preferably 8 to 12 hours, and may further be calcined at a temperature of 500 to 650° C., preferably 580 to 620° C. for 1 to 4 hours, preferably 2 to 3 hours, under a flow of nitrogen gas. The organic solvent may be any solvent that can dissolve sulfur compounds. For example, in certain embodiments, the organic solvent is at least one selected from the group consisting of acetone, methanol, toluene, benzene, and xylene.

Figure 12:
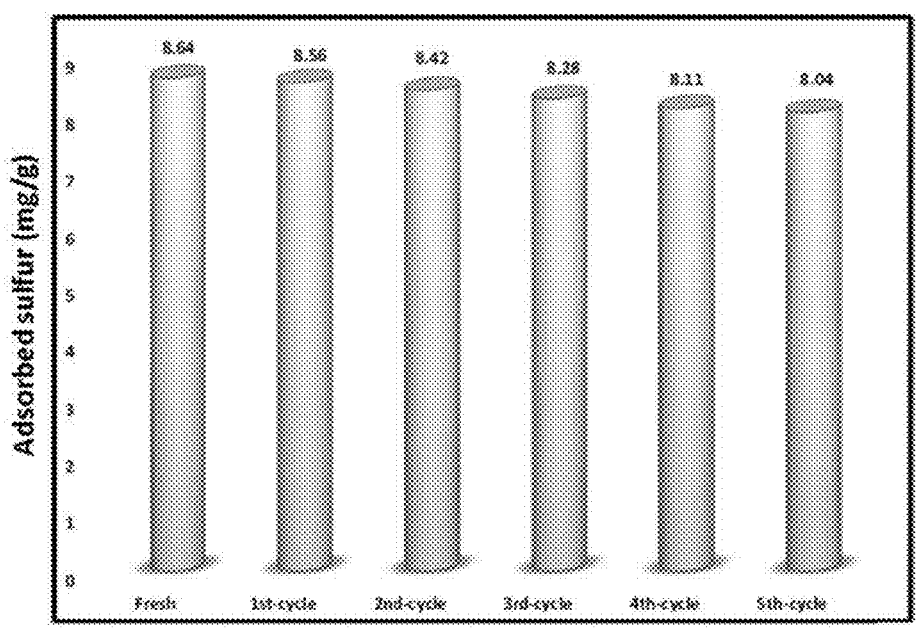
FIG. 12 represents the amount of sulfur compounds adsorbed on the 1BDAC after single/double/multiple regeneration cycles.

The sulfur adsorbent may be regenerated multiple times, for example, in certain embodiments the sulfur adsorbent may be regenerated up to ten times, preferably 2 to 8 times, and preferably 4 to 7 times. After regeneration, the adsorption capacity of the sulfur adsorbent may preferably be reduced by no more than 10%, preferably no more than 8%, preferably no more than 6%, relative to an initial adsorption capacity of the sulfur adsorbent. In a preferred embodiment, the sulfur adsorbent is regenerated 4 to 7 times, preferably 5 to 6 times, wherein the adsorption capacity of the sulfur adsorbent is reduced by no more than 7%, preferably no more than 6%, relative to an initial adsorption capacity of the sulfur adsorbent, as shown in FIG. 12.

An amount of the sulfur adsorbent used to separate the sulfur compounds from the sulfur-containing mixture may depend on the adsorption capacity of the sulfur adsorbent, and a desired concentration of the sulfur compounds in the treated mixture. For example, in one embodiment, a sulfur adsorbent with an adsorption capacity of 5 to 30 mg/g, preferably 8 to 20 mg/g is utilized in an adsorptive desulfurization process. In view of that, 2 to 50 grams, preferably 3 to 30 grams, preferably 4 to 20 grams, preferably 5 to 10 grams of the sulfur adsorbent may be utilized per 1.0 L (1.0 liter) of the sulfur-containing mixture to reduce the concentration of the sulfur compounds of a sulfur-containing mixture by at least 85%, preferably by at least 90%, preferably by at least 95%, relative to an initial concentration of the sulfur compounds in the sulfur-containing mixture.

The examples below are intended to further illustrate protocols for the sulfur adsorbent and the method of separating sulfur compounds with the sulfur adsorbent, and are not intended to limit the scope of the claims.

Example 1—Materials and Adsorbent Preparation

In the following examples, the effects of boron content on the physicochemical properties of boron-doped AC adsorbents were investigated. The boron-doped AC adsorbents were particularly used for the removal of bulky and recalcitrant sulfur-containing compounds such as 4,6-dimethyldibenzothiophene (DMDBT) from fuel.

A series of boron-doped activated carbons containing boron at a weight percent of 0.5-10 wt % was obtained from boric acid (Sigma Aldrich≥99.5%). This boron was doped on commercial activated carbon (AC) purchased from Sigma Aldrich (activated carbon, 100-400 mesh). The doping process was carried out by first using an excess solution impregnation approach using high quality de-ionized water (18 μS/cm) produced by Thermo Scientific Barnstead NANOPURE after distillation with a Labstrong FiS-TREEM™ II 2S Glass Still distiller Filstreem. The solvent was removed by slow evaporation of solvent at 60° C. for 12 h to prevent aggregation of boron particles that may be formed during drying process, due to concentration gradient. The adsorbent was further dried at 105° C. for 6 h in JEIO TECH vacuum oven (OV-11), before calcination at 600° C. in the presence of high purity $N_2$-gas for 150 min. The final adsorbent is denoted as xBDAC, where x represents the ca. % of boron doped on AC.

Example 2—Boron Content Measurement

Boron content of adsorbents was analyzed by inductively coupled plasma-mass spectrometry (ICP-MS, XSeries 2 Thermo-Scientific). Approximately 5 mg of samples was digested in boron free-container (PTFE) using 1 mL of HF (48%, Sigma-Aldrich), and subsequently heated at 60° C. for 12 h before serial dilution with de-ionized $H_2O$ to make suitable concentration for ICP-MS.

An insight into dispersion of adsorbents was obtained from the quantitative data. The correlation between the calculated amount and the quantitative amount determined by ICP-MS at low boron loadings (0.5-2.5 wt. %) indicated a well dispersion of boron that may be useful for improved adsorption capacity. However, at higher boron loadings (5-10 wt. %), there is low dispersion as evidenced from disparity between the calculated amount and ICP-MS determined amount.

Example 3—$N_2$-Sorption Analysis $N_2$-sorption analysis of pure AC and boron-doped AC was estimated by micromeritics ASAP 2020 at −196° C. for a previously degassed adsorbent at 300° C. for 4 h. The surface area was determined by the Brunauer, Emmet and Teller (BET) method, while pore size distribution (PSD) and total pore volume were estimated by desorption part of Barret, Joyner and Halenda (BJH) method. And the results are represented by the isotherms shown in FIG. 1A-1F. It was observed that the pore size distribution of the modified and pure AC adsorbents follow a similar and uniform distribution pattern. In addition, all adsorbents exhibited single peaks that were uniformly distributed over a respective pore width region. The largest pore size distribution was obtained at 10% loading (28-44 Å), and pure AC showed the smallest pore size distribution (30-43 Å).

Basically, the AC adsorbent has a large surface area that consists of over 1000 $m^2 g^{-1}$ with 60% contribution of external surface area, along with the presence of both mesopores and micropores. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. Table 1 shows that the BET surface area of AC is reduced as boron loading increases from 0.5% to 10%. This was as a result of boric acid ions covering available pores on the surface of AC, with larger coverage obtained due to increased loading.

Figure 18:
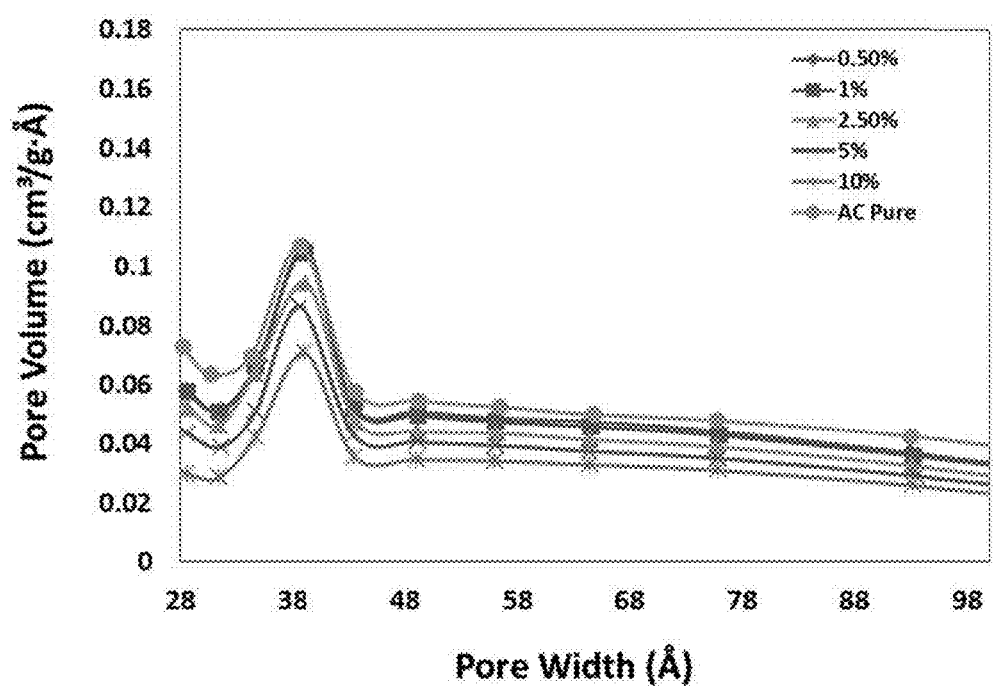
FIG. 18 represents pore size distribution of the activated carbon particles (i.e. Pure AC) and the sulfur adsorbents having various boric acid contents.

Large percentage reduction in the surface area was observed at 2.5%, 5% and 10% boric acid loading, corresponding to 23.5%, 43.1% and 67.7% reduction respectively. The same reduction trend was also observed for micropore volume, mesopore volume, and total pore volume of the as-modified AC adsorbents, as was similar to the surface area trends, as shown in FIG. 18. However, the 10BDAC revealed to have the largest average pore size, which can be attributed to the pore size of the original AC-support as well as the combination of boric acid used as modifier. At 0.5% to 5% boric acid loading, acceptable range of pore size was obtained and include values lower than that of pure AC.

TABLE 1

Physicochemical properties and Raman integral ratio of adsorbents.

| Adsorbents | $S_{BET}$[a] $(m^2/g)$ | $V_{MICRO}$[b] $(cm^3/g)$ | $V_{MESO}$[c] $(cm^3/g)$ | $V_{TOTAL}$[d] $(cm^3/g)$ | $I_G/I_D$[e] | TPD-acidity[f] (mmol/g) | ICP-[g] B (wt %) |
|---|---|---|---|---|---|---|---|
| Pure AC | 1108 | 0.206 | 0.802 | 1.008 | 1.114 | 0.73 | Na |
| 0.5BDAC | 978 | 0.206 | 0.666 | 0.872 | 1.269 | 1.05 | 0.46 |
| 1BDAC | 972 | 0.205 | 0.655 | 0.860 | 1.264 | 1.27 | 1.06 |
| 2.5BDAC | 848 | 0.173 | 0.587 | 0.761 | 0.893 | 1.43 | 2.63 |
| 5BDAC | 631 | 0.107 | 0.514 | 0.621 | 0.936 | 1.43 | 4.47 |
| 10BDAC | 359 | 0.034 | 0.418 | 0.451 | 0.880 | 1.49 | 11.10 |

Figure 2:
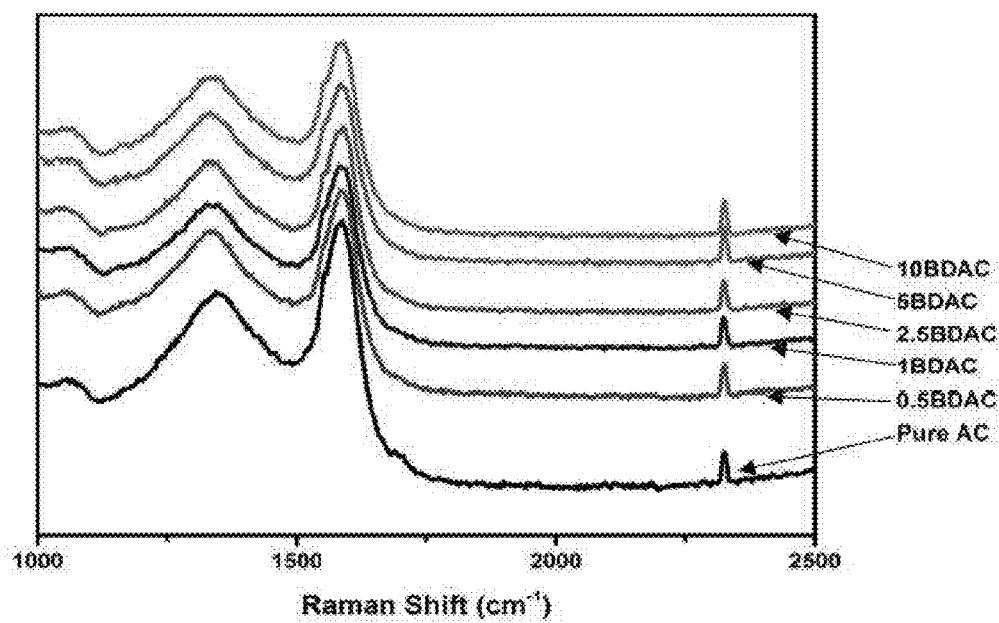
FIG. 2 represents Raman spectra of the activated carbon particles (i.e. Pure AC) and the sulfur adsorbents having various boric acid contents.

[a] BET surface area.
[b] Micro-pore volume.
[c] Meso-pore volume.
[d] Total pore volume.
[e] Intensity ratios from Raman bands G and D.
[f] Surface acidity by $NH_3$—TPD
[g] ICP—OES analysis of Boron Example 4—Raman Spectroscopy Analysis Raman spectroscopy analysis was conducted on (iHR320 with CCD detector, HORIBA) from Horiba with excitation wavelength of 532 nm green to study the graphitic and defect change due to boron addition. From the Raman spectra displayed in FIG. 2, all the as-synthesized samples and pure AC exhibited same pattern, typifying the stability of the disordered AC structure in the modified adsorbents, which is a common phenomenon associated with activated carbon components. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. Also, the two main peaks associated with the Raman spectra around 1340 and 1580 $cm^{-1}$ are significant to band types D and G respectively, strongly proposing the presence of entirely amorphous structure. See J. Roh, Structural study of the activated carbon fiber using laser Raman spectroscopy, Carbon Lett. 9 (2008) 127-130. However, differing intensity levels and width are associated to D and G peak regions, with the D-band significant to degenerate species, disorder and crystallinity variations, while the G-band is associated with the lone admissible Raman transition in the spectrum field of large carbon crystallites/particles and the stretching vibrations. See K. Pyrzyn' ska, M. Bystrzejewski, Comparative study of heavy metal ions sorption onto activated carbon, carbon nanotubes, and carbon-encapsulated magnetic nanoparticles, Colloids Surf. A Physicochem. Eng. Asp. 362 (2010) 102-109; R. Escribano, J. J. Sloan, N. Siddique, N. Sze, T. Dudev, Raman spectroscopy of carbon-containing particles, Vib. Spectrosc. 26 (2001) 179-186. The ratio of the integral area of the G-band and D-band ($I_g/I_d$) indicates crystallinity, and 0.5BDAC showed the highest value according to Table 1. Thus, it was inferred that 0.5 and 1 wt. % loading of boric acid on AC improves structural stability of AC. However, lower values of $I_g/I_d$ (<1.11) at 2.5% loading and above reduced the structural stability of AC, which can be associated to the presence of structural defect in the respective modified AC adsorbents.

Example 5—Functional Group Analysis by FTIR

Functional group analysis of AC and boron-doped adsorbent was studied by Fourier transform infrared (FTIR) with Thermo Scientific Nicolet 6700 spectrometer model. Translucent disc composed of adsorbent and KBr were mixed in the ratio of 2:100 respectively, and recorded at scanning range of 400-4000 $cm^{-1}$. Accordingly, the BDAC adsorbents and pure AC were studied for improved adsorption capacity and the obtained spectra are shown in FIG. 3. All the samples showed similar spectra with the two prominent peaks, first at 1100 $cm^{-1}$ band which is significant to the infrared vibrations of C—O; and secondly at 1600 $cm^{-1}$ which can be assigned to the bending of H—O—H bonds. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500; J. Romanos, M. Beckner, D. Stalla, A. Tekeei, G. Suppes, S. Jalisatgi, M. Lee, F. Hawthorne, J. D. Robertson, L. Firlej, B. Kuchta, C. Wexler, P. Yu, P. Pfeifer, Infrared study of boron-carbon chemical bonds in boron-doped activated carbon, Carbon N. Y. 54 (2013) 208-214, each incorporated herein by reference in its entirety. These peaks are synonymous to the major characteristic of FTIR spectra exhibited by carbonaceous materials. See P. A. Bazula, A.-H. Lu, J.-J. Nitz, F. Schüth, Surface and pore structure modification of ordered mesoporous carbons via a chemical oxidation approach, Microporous Mesoporous Mater. 108 (2008) 266-275. However, the band at 1600 $cm^{-1}$ fades as the boron loading increased. Also, the emergence of C=C vibration was observed between 1400 and 1450 $cm^{-1}$, with increasing peak intensity as the boron loading increased according to FIG. 3. See J. Romanos et al. Similar to the work done by Fontan et al., an extra broad band between 1250 and 1350 $cm^{-1}$ was observed, which could be due to boric acid modification/activation, although, this peak fades as the loading increased more than 5%. See M. J. P. Brito, C. M. Veloso, R. C. F. Bonomo, R. da C. I. Fontan, L. S. Santos, K. A. Monteiro, Activated carbons preparation from yellow mombin fruit stones for lipase immobilization, Fuel Process. Technol. 156 (2016) 421-428. In addition, intensity of the prominent peak around 550 $cm^{-1}$ in pure AC was reduced in the spectra exhibited by modified AC samples. This can be attributed to the presence of boric acid loading in the samples. Furthermore, the peak band attributed to hydroxyl group (C—OH) stretching mode was present in all the sample spectra at 3420 $cm^{-1}$ except for 10BDAC exhibiting this peak at 3220 $cm^{-1}$. See J. Romanos et al.; and X. Hu, H. Zhang, Z. Sun, Adsorption of low concentration ceftazidime from aqueous solutions using impregnated activated carbon promoted by iron, copper and aluminum, Appl. Surf. Sci. 392 (2016) 332-341. Interestingly, an extra peak in the spectra of 5BDAC band was observed, which is at the same position of the hydroxyl stretching band 10% boric acid loading. These observations from the FTIR spectra in FIG. 3 are in accordance with the work previously carried out by Romanos et al. See J. Romanos et al.

Example 6—Surface Acidity

Surface acidity by temperature programmed desorption of ammonia was estimated on Micromeritics Chemisorb 2750 pulse chemisorption system with approximate 100 mg of adsorbent. Each adsorbent sample was placed in a quartz tube and ramped to 550° C. under helium flow for 1 h, then cooled to 100° C. before adsorption of 10 wt. % $NH_3$ on the surface of the adsorbents at the same temperature for 30 min. Prior to desorption analysis, the physically adsorbed $NH_3$ on adsorbent was removed by flowing of helium for additional 1 h, and the temperature was linearly increased to 1000° C. at 10° C./min, using thermal conductivity detector (TCD) to obtain TPD profiles.

As shown in Table 1, the surface acidity increases as incorporation of boron increases on AC. The nature of surface acidity distribution falls within medium and strong acidity, and can be observed at 212-283° C. and 680-above, respectively (FIG. 4). The desorption peaks occurrence between 212 and 283° C. associates to weak carboxylic acid group and lactone while phenol, carbonyl and ether are identified by peaks above 650° C. See J. Figueiredo, M. F. Pereira, M. M. Freitas, J. J. Órfão, Modification of the surface chemistry of activated carbons, Carbon N. Y. 37 (1999) 1379-1389. The characteristic surface acidity nature of the AC is mainly strong acidity, and the incorporation of boron redistributes this nature of acidity to both medium and strong, which could be influential to adsorption of sulfur compound. It should be mentioned that the overall surface acidity of the 10BDAC is higher than other adsorbents, at the expense of textural properties (surface area, pore volume and pore size) which reduced significantly. This phenomenon might result in loss of active sites, and consequently low adsorption capacity of adsorbent. The preferred balance of higher acidity was observed between 0.5 and 2.5 wt. % boron incorporation, with relative preservation of textural properties with respect to loading.

Example 7—Scanning Electron Microscope (SEM) Analysis

Scanning electron microscope (SEM) analysis of pure AC and boron-modified AC was examined on JEOL-SEM to study the morphological differences in the adsorbents. Accordingly, the SEM micrograph of FIG. 5A was taken from the surface of the AC, and the SEM micrograph of FIGS. 5B-5F was taken from the surface of the modified AC adsorbents. These SEM micrographs exhibited irregular crystal patterns without the presence of particle agglomerations, which may be due to the dispersion uniformity of boron on the amorphous carbon surface of AC. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. There is no significant morphology difference between the AC and boron-doped AC adsorbents as observed from the scanning electron micrographs, however, there are differences in their dispersion when observed through EDS mapping, as shown in FIGS. 19A-19C. The observed mapping by EDS analysis show more dispersion at low boron loadings (1-2.5%) than high loadings (5-10%), which is in agreement with other characterization results (vide supra). This appears to show that the adsorption capacity present on AC surface can be increased via successful incorporation of boron on pure AC.

Example 8—Sulfur Adsorption Measurement

Adsorption experiments were conducted at room temperature (RT) batch mode using 40 ml capped-vial with 20 mL solution of model fuel containing DMDBT at different sulfur concentrations (50-300 ppmw-S) in isooctane. Various boron-doped activated carbon (BDAC) adsorbents in the range 0.5-10 wt. % were evaluated at maximum 4 h contact time under constant stirring at 300 rpm. The sulfur equilibrium concentration taken at different time interval was analyzed by both Agilent gas chromatography (GC, model #7890A) and sulfur chemiluminescence detector (SCD, 355). Quantitative adsorption capacity (qe, mg-S/g-adsorbent) at equilibrium was determined by the Eq. (1) below;

$$q_e = (C_o - C_e)\frac{V}{W} \qquad (1)$$

where $C_o$ (mg/L) and $C_e$ (mg/L) represent initial and equilibrium concentrations of sulfur compound respectively, V (L) is the volume of the model fuel solution, and w (g) is the weight of adsorbents.

Figure 6:
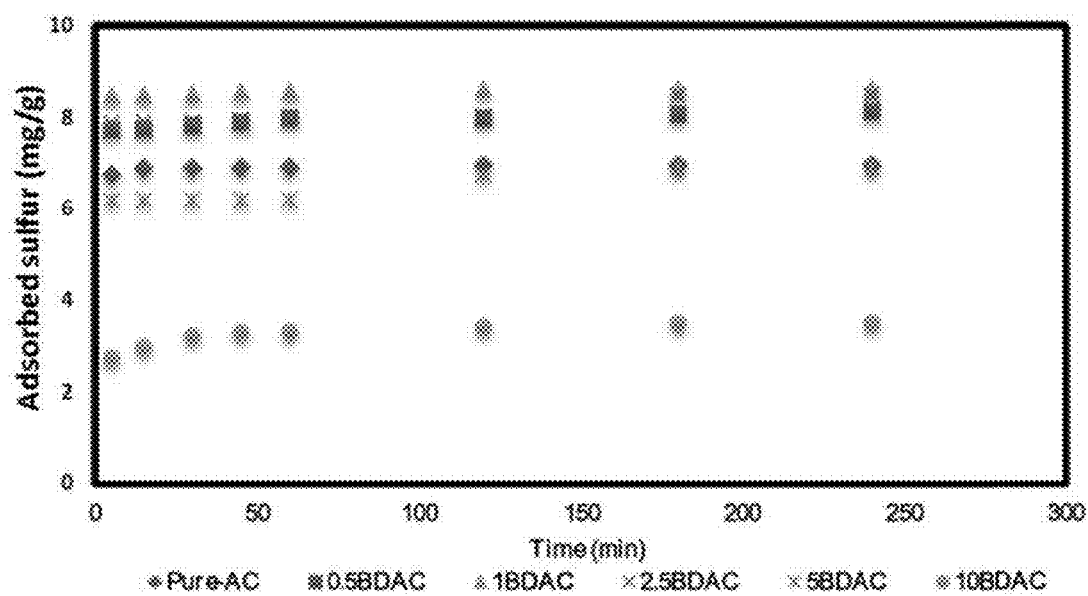
FIG. 6 represents the amount of sulfur compounds adsorbed on the activated carbon particles (i.e. Pure AC) and on the sulfur adsorbents having various boric acid contents, over a time span of 5 hours.
Figure 7:
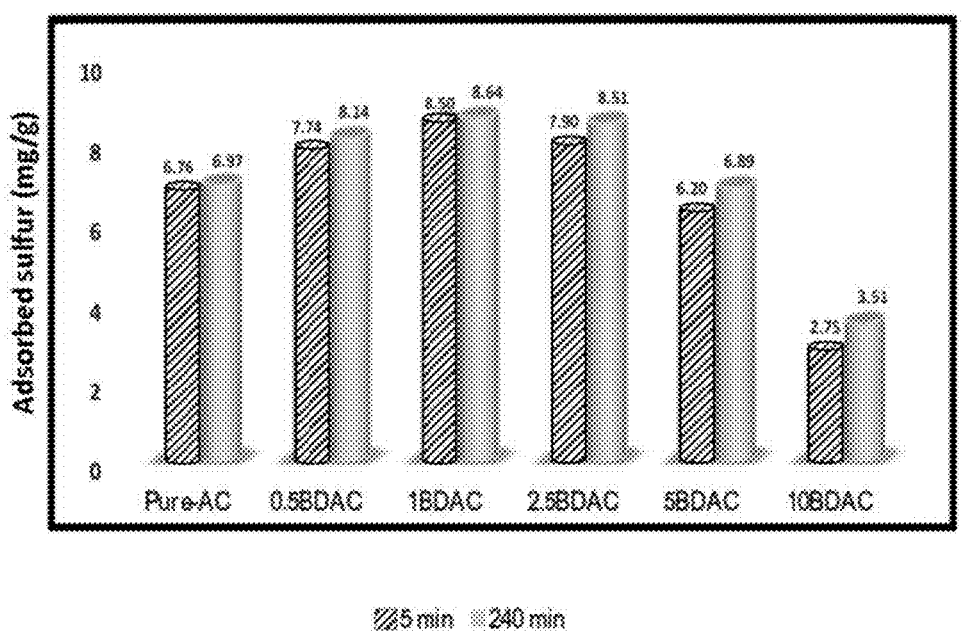
FIG. 7 represents a comparison of the amount of sulfur compounds adsorbed on the activated carbon particles (i.e. Pure AC) and the sulfur adsorbents having various boric acid contents, a) after 5 minutes, b) after 240 minutes.

Both AC and the BDAC adsorbents, regardless of the boron loading, show fast uptake of DMDBT in 5 min with more than 95% removal of DMDBT by all the studied adsorbents. Notably, low loading of boron (0.5-2.5%) onto AC yielded adsorbents with improved adsorption capacities than AC, unlike in the cases of high loading of boron, at initial concentration of 100 ppm-S of DMDBT. Boron-sulfur interactions in form of acid-base interactions, together with the large preservation of surface area (compared to high boron loading adsorbents at 5 and 10 wt. %) could be responsible for better adsorption capacities in the cases of low boron loading onto AC. Both textural and surface acidity have been found to play crucial role in achieving enhanced adsorption capacities of materials for removal of sulfur-containing compounds from fuel. Our previous work showed that doping AC with metal could improve the surface acidity and at the same time reduce the surface area which is as also an important property to be large enough to address the mass transport of the bulky adsorbate like DMDBT across the pores of the adsorbent. See S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: role of surface acidity and textural properties, Chem. Eng. J. 303 (2016) 489-500, incorporated herein by reference in its entirety. Incorporation of boron above 2.5 wt. % resulted in decrease in adsorption capacity, as observed for 5BDAC and 10BDAC (according to FIGS. 6 and 7), despite having increased surface acidities compared to modified adsorbent at low boron loading. The 1BDAC adsorbent showed the best performance compared to others and this remarks 1 wt. % to be the most preferred boron loading to achieve a reasonable balance between improved surface acidity and preservation of textural properties.

Figure 8:
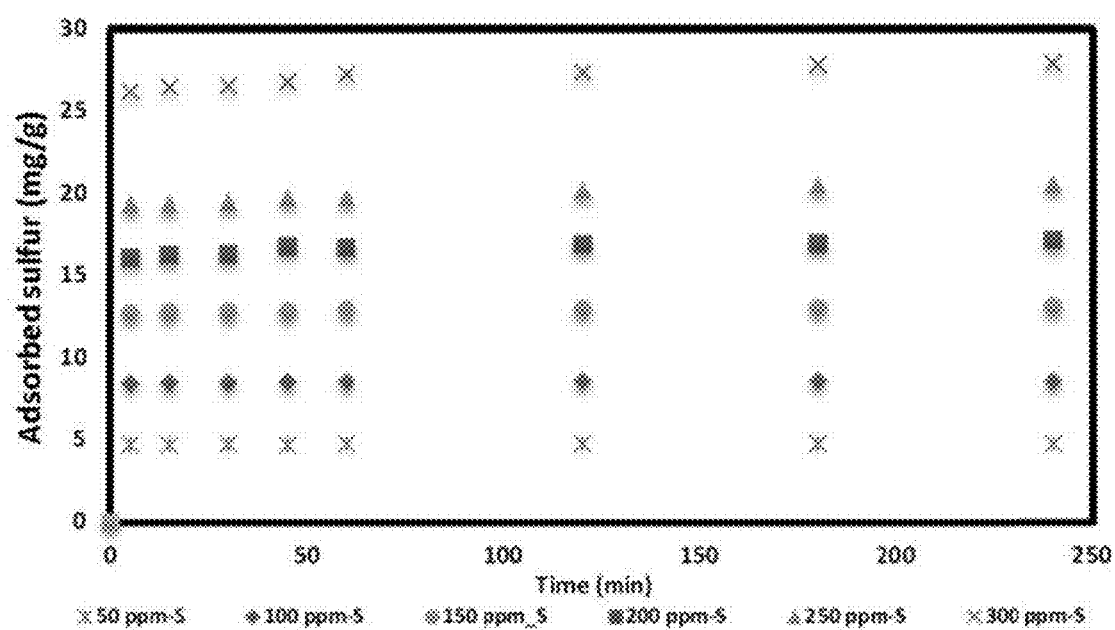
FIG. 8 represents the amount of sulfur compounds adsorbed on the sulfur adsorbent having 1.0 wt % of boric acid (i.e. 1BDAC) over a time span of 5 hours, at various initial sulfur concentrations of a sulfur-containing mixture.
Figure 9:
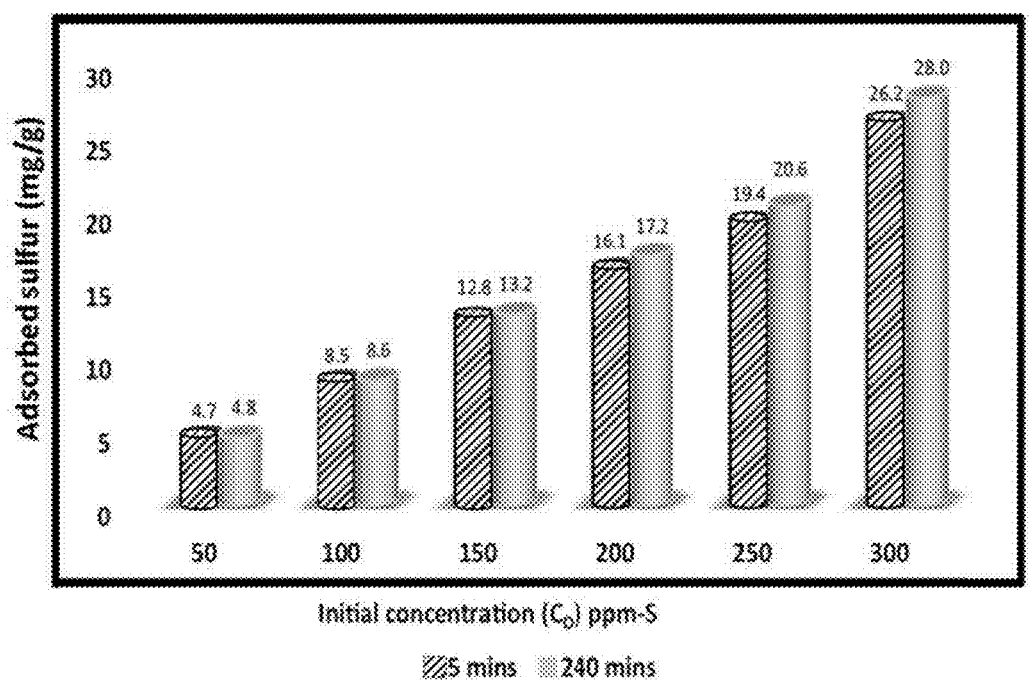
FIG. 9 represents a comparison of the amount of sulfur compounds adsorbed on the 1BDAC, at various initial sulfur concentrations of the sulfur-containing mixture, a) after 5 minutes, b) after 240 minutes.

The adsorption capacity performance of 1BDAC as a function of different initial concentrations (50-300 ppmw-S in DMDBT) was observed at fixed weight of adsorbent. As shown in FIGS. 8 and 9, the adsorptive desulfurization capacity of adsorbent based on amount of sulfur removal, increases with increase in initial concentration. This is due to higher composition of sulfur in the model fuel, at higher initial concentration. The adsorption of sulfur at low solution concentrations (50-150 ppmw-S) is very fast within 5 min and remains insignificant throughout the contact time chosen for the experiment (240 min), while for higher concentration (200-300 ppmw-S), there is an increase of 6% adsorption of sulfur between 5 and 240 min contact time. The corresponding maximum adsorption of sulfur is 4.8, 8.6, 13.2, 17.2, 20.6 and 28 mg for 50, 100, 150, 200, 250 and 300 ppm, respectively, at room temperature. Owing to this observation, at fixed adsorbent weight, the estimated total sulfur removal increases proportionally with increasing initial concentration. However, the adsorption capacity decreased due to larger sulfur content in the solutions with higher concentration.

Figure 10:
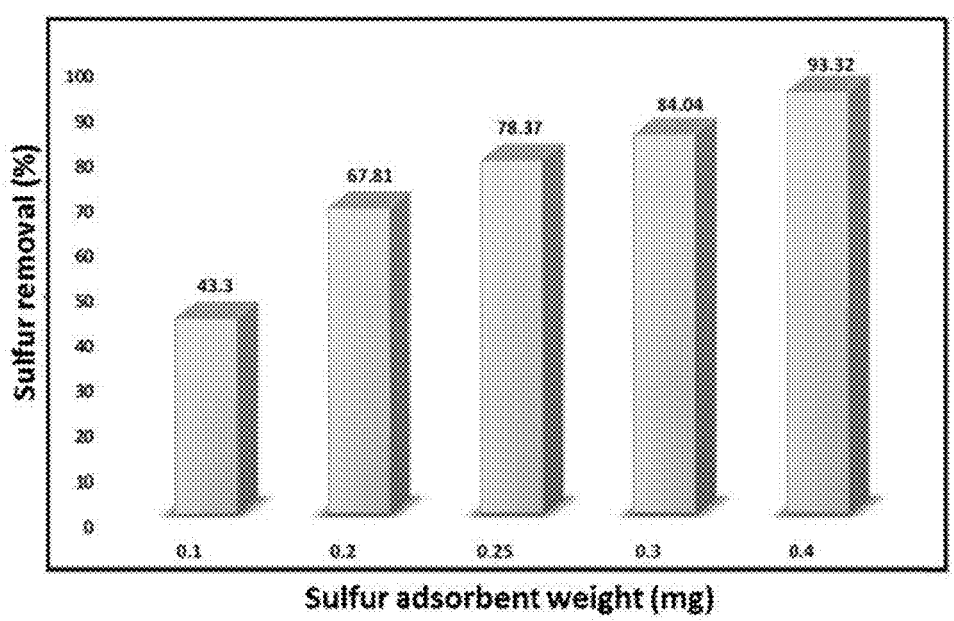
FIG. 10 represents the amount of sulfur compounds adsorbed on the 1BDAC after 240 minutes, at various sulfur adsorbent amounts, wherein an initial sulfur concentration of the sulfur-containing mixture is 200 ppmw.

In addition, another study was carried out on the effect of sorbent dosage as a function of adsorption capacity. The adsorptive desulfurization was performed at a fixed weight of adsorbent, the performance of 1BDAC with varied weight at constant initial model fuel concentration is worth evaluating. Adsorption capacity as a function of weight of adsorbent within 0.1-0.4 g using 1BDAC was investigated in 20 mL model fuel containing 200 ppmw-S of DMDBT for 240 min. As presented in FIG. 10, the sulfur removal capacity increased from 86 to 186 ppmw-S, corresponding to 43 and 96 percentage removal respectively. Consequently, the equilibrium quantity ($q_e$) of sulfur (mg) adsorbed per gram of adsorbent was decreased from 19.1 to 7.7 mg/g. This phenomenon could be attributed to the presence of greater number of active sites available for DMDBT molecules with increase in mass of adsorbent for a fixed concentration of model fuel.

Example 9—Selectivity of the Sulfur Adsorbents

Selectivity study was conducted with same procedure described above for the best adsorbent with inclusion of naphthalene to model fuel solution at three concentrations (100, 200 and 300 ppmw). Selectivity of the 1BDAC adsorbent was investigated in a model fuel solution spiked with naphthalene of equal concentrations with sulfur in the range of 100-300 ppmw using 200 mg of adsorbent. Naphthalene, being an aromatic compound that competes with the same active sites with refractory sulfur compounds in fuel was selected for selectivity study using the best adsorbent (1BDAC) for 240 min contact time. The adsorption capacity efficiency of 1BDAC in model fuel containing naphthalene is almost the same as pure model fuel (isooctane) for DMDBT (FIG. 11). This observation might be attributed to the ability of DMDBT to be preferentially adsorbed on the active site of modified adsorbent through acid-base interaction resulted from contribution of oxygen containing functional group of activated carbon and sulfur in DMDBT, and as well the boron-sulfur interaction, over naphthalene. See A. Zhou, X. Ma, C. Song, Effects of oxidative modification of carbon surface on the adsorption of sulfur compounds in diesel fuel, Appl. Catal. B Environ. 87 (2009) 190-199; Y. Yang, H. Lu, P. Ying, Z. Jiang, C. Li, Selective dibenzothiophene adsorption on modified activated carbons, Carbon N. Y. 45 (2007) 3042-3044.

Example 10—Regeneration of Spent Adsorbents

Figure 20A:
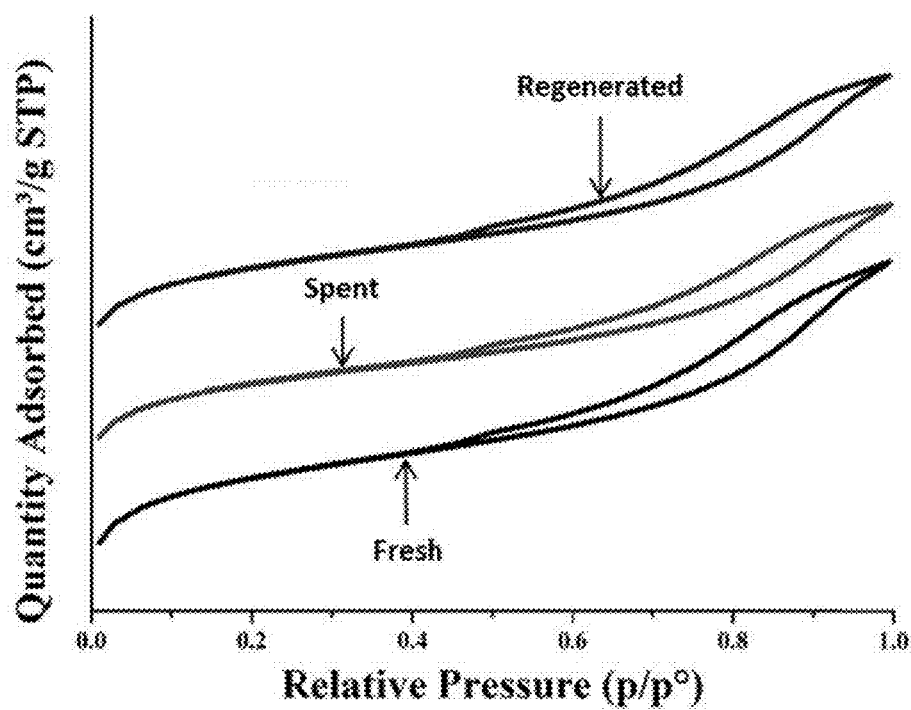
FIG. 20A represents a comparison of the $N_2$-physisorption isotherms of the sulfur adsorbent with 1.0 wt % of boric acid (i.e. 1BDAC), when the sulfur adsorbent is fresh; spent/used; and regenerated.
Figure 20B:
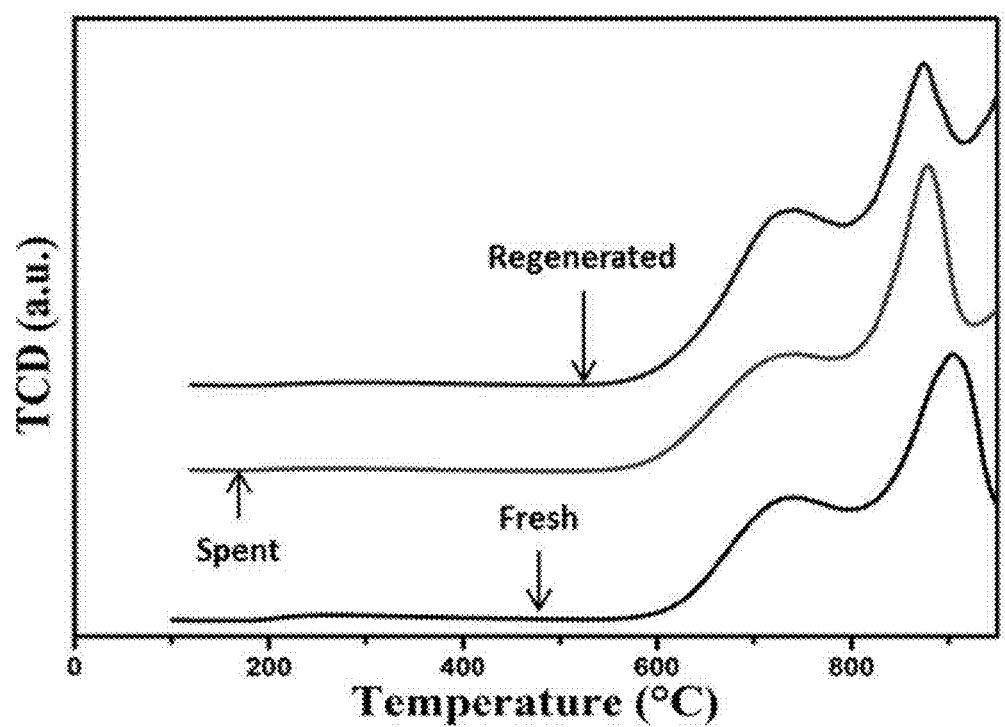
FIG. 20B represents a comparison of the $NH_3$-TPD spectra of the sulfur adsorbent with 1.0 wt % of boric acid (i.e. 1BDAC), when the sulfur adsorbent is fresh; spent/used; and regenerated.
Figure 20C:
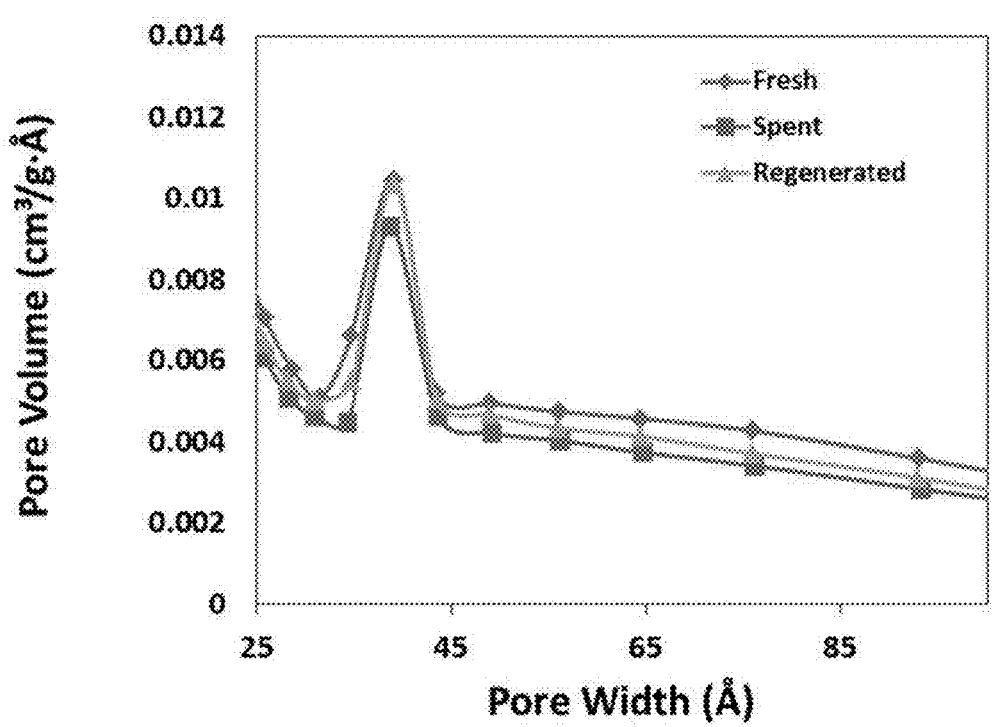
FIG. 20C represents pore size distribution of the sulfur adsorbent with 1.0 wt % of boric acid (i.e. 1BDAC), when the sulfur adsorbent is fresh; spent/used; and regenerated.

The regeneration study of spent adsorbent was conducted by using combined solvent and thermal approaches. The spent adsorbent was treated in 30 mL ethanol per 1 g of 1BDAC at 60° C. for 60 min under continuous stirring, and the solvent is allowed to dry completely at 105° C. for 10 h in drying oven. The sample was further calcined at 600° C. in $N_2$ flowing at 30 mL/min for 150 min, and the regenerated adsorbent was re-used for 5 additional adsorption batch processes as described in adsorption experiment above. Accordingly, the adsorbent (1BDAC) was regenerated and reused for additional five-times after usage at 100 ppm-S containing model fuel. The results presented in FIG. 12 show excellent regeneration performance and the potential of this adsorbent for commercial operations with only 7% loss in adsorption capacity after additional five-cycle regeneration compared to fresh adsorbent. This could be attributed to recovery of most of the active sites after acetone washing and thermal treatment of spent adsorbent, as observed by characterization results from spent and regenerated adsorbent in comparison with fresh adsorbent for 1BDAC, as shown in FIGS. 20A-20C and Table 2.

TABLE 1

Physicochemical properties of fresh, spent, and regenerated 1BDAC adsorbent.

| Adsorbents | $S_{BET}{}^a$ (m²/g) | $V_{MICRO}{}^b$ (cm³/g) | $V_{MESO}{}^c$ (cm³/g) | $V_{TOTAL}{}^d$ (cm³/g) | Avg. PS$^e$ (nm) | TPD-acidity$^f$ (mmol/g) | ICP-$^g$ B(wt %) |
|---|---|---|---|---|---|---|---|
| Fresh 1BDAC | 971.71 | 0.2048 | 0.6549 | 0.8597 | 5.668 | 1.27 | 1.06 |
| Spent 1BDAC | 796.23 | 0.1571 | 0.4007 | 0.5578 | 5.613 | 0.84 | N/A |
| Regenerated 1BDAC | 858.82 | 0.1574 | 0.4421 | 0.5996 | 5.575 | 1.12 | 0.95 |

$^a$ BET surface area
$^b$ Micropores volume
$^c$ Mesopores volume
$^d$ Total pore volume
$^e$ Average BJH-Adsorption pore size
$^f$ Surface acidity by $NH_3$—TPD
$^g$ Boron weight percent by ICP—MS Example 11—Kinetics of Adsorption Kinetic study was carried out on the prepared AC and boron modified AC adsorbents using first, second order model, and diffusion study using intra-particle diffusion model. The adsorption isotherms were studied by Langmuir and Freundlich for the best adsorbent. The results obtained were compared based on the regression coefficient ($R^2$) with the best data fit.

In a view to properly analyze the kinetic data for the experiment, three kinetic models were employed: pseudo-first order, pseudo-second order and the intra-particle diffusion models. See N. Farzin Nejad, E. Shams, M. K. Amini, J. C. Bennett, Ordered mesoporous carbon CMK-5 as a potential sorbent for fuel desulfurization: application to the removal of dibenzothiophene and comparison with CMK-3, Microporous Mesoporous Mater. 168 (2013) 239-246; Y. Shi et al; R. Neubauer et al., Acid base interaction and its influence on the adsorption kinetics and selectivity order of aromatic sulfur heterocycles adsorbing on Ag—Al2O3, Chem. Eng. J. 309 (2017) 840-849.

The pseudo-first order originally given by Lagergren is expressed in Eq. (2) below. See Y. S. Ho, Citation review of lagergren kinetic rate equation on adsorption reactions, Scientometrics 59 (2004) 171-177.

$$\ln(q_e-q_t)=\ln(q_e)-k_1 t \quad (2)$$

where $q_e$(mg/g) and $q_t$(mg/g) are the quantities of absorbate at equilibrium and at time t(min) respectively. The rate constant is given by $k_1$ (min$^{-1}$) often referred to as Lagergren constant. See Y. Ho, G. McKay, Pseudo-second order model for sorption processes, Process Biochem. 34 (1999) 451-465.

A plot of $\ln(q_e-q_t)$ vs t gives a slope significantly interpreted as the rate constant and the intercept is found to be $\ln(q_e)$.

$$\frac{t}{q_r} = \frac{1}{k_2 q_e^2} + \frac{t}{q_e} \quad (3)$$

$$q_t = k_{id} t^{0.5} + C \quad (4)$$

All other parameters have been defined before except $k_{id}$ that illustrates the intra-particle diffusion constant (mg/g·h$^{0.5}$). Eq. (3) shows pseudo-second order kinetic model while the Eq. (4) illustrates intra-particle diffusion. The pseudo-first order kinetic model, according to Ho, gives the description of early-stage adsorption while the pseudo-second order gives an excellent illustration of the whole adsorption process. See N. Farzin Nejad et al. and Y. Ho et al. Meanwhile, the intra-particle diffusion gives information on adsorption mechanism and supplies additional information on whether the rate controlling step is the intra-particle diffusion or there is contribution from another source. These, when combined with kinetic models stated above, were adopted in the analysis of our kinetic data.

Figure 15:
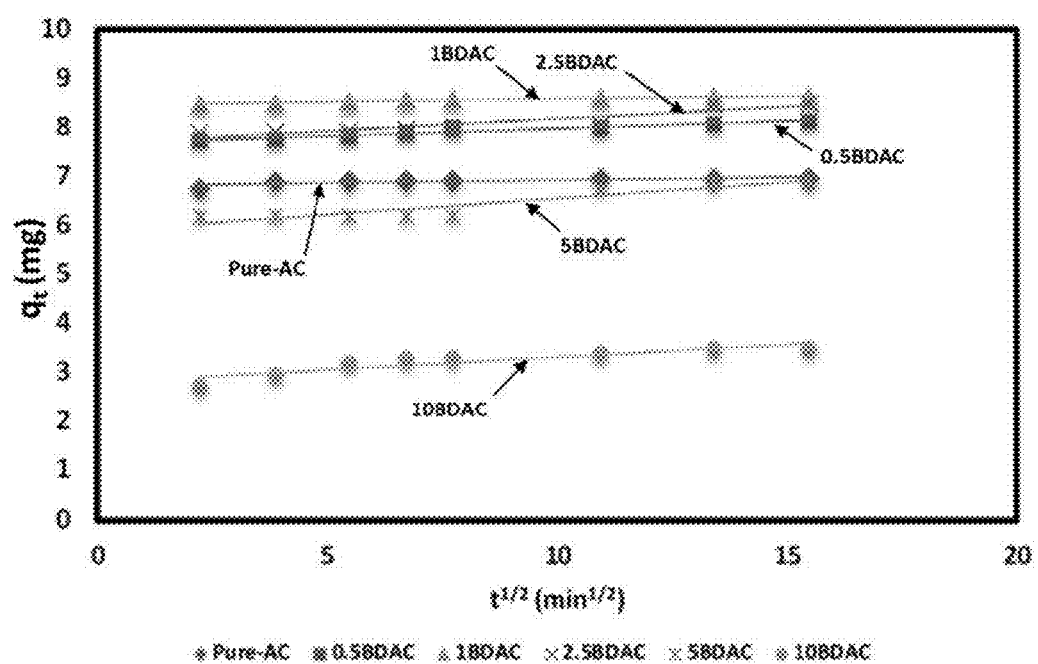
FIG. 15 represents a fitness of adsorption data of the sulfur adsorbents at various boric acid contents to an intra-particle diffusion model.

From Table 3, for the first order model examined, linear fitting examination of the data reveals mixed fitting of the models, based on the regression coefficient ($R^2$) where some are close to 1 while few are far away. This indicates that pseudo-first order did not fit well. On the contrary, the data are well fitted to the second order model based on value of $R^2$ as stated above. All the values are close to 1 indicating the applicability of pseudo-second order model (FIGS. 13, 14, and 15). From the pseudo-second-order model considered, our results show that 0.5BDAC, 1BDAC and 2.5BDAC adsorbents were effective for sulfur removal on the DMDBT examined; with $q_e$ estimated to be 8.14, 8.65 and 8.55 mg/g as compared to 6.97 mg/g for pure AC. Also, sulfur removal increased as the loading increased until 1BDAC when it started declining. This can be rationalized by insignificant loss in the surface area needed for adsorption until at 1BDAC, and where there is excessive covering of the effective surface area, hence, any further increment would lead to blockage of the active sites. Thus, 1BDAC is the most preferred loading capacity for the system investigated here.

TABLE 3

Summary of parameters obtained after fitting various kinetic models.

| | First order kinetic model | | | Second order kinetic model | | | Intra-particle diffusion model | | |
|---|---|---|---|---|---|---|---|---|---|
| | $q_e$ (mg/g) | k (min$^{-1}$) | $R^2$ | $q_e$ (mg/g) | $k_2$ | $R^2$ | C | $k_{id}$ | $R^2$ |
| Pure AC | 0.133 | 0.0208 | 0.882 | 6.97 | 0.514 | 1.000 | 6.81 | 0.0117 | 0.650 |
| 0.5BDAC | 0.399 | 0.0108 | 0.925 | 8.14 | 0.116 | 0.999 | 7.68 | 0.0306 | 0.942 |
| 1BDAC | 5.86 | 0.0192 | 0.996 | 8.65 | 0.374 | 1.000 | 8.48 | 0.0117 | 0.935 |
| 2.5BDAC | 1.39 | 0.0259 | 0.694 | 8.55 | 0.0456 | 0.999 | 7.68 | 0.0505 | 0.841 |
| 5BDAC | 0.648 | 0.0018 | 0.0324 | 6.98 | 0.0397 | 0.999 | 5.90 | 0.0657 | 0.850 |
| 10BDAC | 0.777 | 0.0244 | 0.932 | 3.54 | 0.0938 | 1.000 | 2.83 | 0.0512 | 0.812 |

From the intra-particle diffusion model presented above, the graph of $q_t$ versus $t^{1/2}$ shows non-zero origin. The value of the constant C indicates how thick the boundary layer is. See I. A. W. Tan, A. L. Ahmad, B. H. Hameed, Adsorption of basic dye on high-surface-area activated carbon prepared from coconut husk: equilibrium, kinetic and thermodynamic studies, J. Hazard. Mater. 154 (2008) 337-346. A graph passing through the origin represents a system where the data fits the intra-particle diffusion model. The nature of the intercept indicates that intra-particle diffusion was not the rate limiting step. See M. Ishaq, S. Sultan, I. Ahmad, H. Ullah, M. Yaseen, A. Amir, Adsorptive desulfurization of model oil using untreated, acid activated and magnetite nanoparticle loaded bentonite as adsorbent, J. Saudi Chem. Soc. 21 (2015) 143-151.

The purpose of considering adsorption isotherm in adsorption process is mainly to study the interaction between the adsorbate and adsorbent in the system which is harnessed in the adjustment of the adsorbents. They describe the distribution of molecules in the solid and liquid states when equilibrium is reached. See I. A. W. Tan et al. This helps in the design of adsorption equipment. In view of that, adsorption data for 1BDAC were plotted to follow the equations of Langmuir and Freundlich. See Y. Shi et al. The fitting parameters are reported in Table 4.

TABLE 4

Summary of parameters obtained after fitting isotherm models.

| | Freundlich | | | Langmuir | | |
|---|---|---|---|---|---|---|
| Sample code | $K_f{}^a$ | n | $R^2$ | $q_m{}^b$ | $k_L{}^c$ | $R^2$ |
| 1BDAC | 3.22 | 2.41 | 0.969 | 30.2 | 0.0308 | 0.864 |

$^a$ (mg S g$^{-1}$) (kg mg S$^{-1}$)1/n.
$^b$ mg S g$^{-1}$.
$^c$ kg mg S$^{-1}$.

The equations below give the equilibrium expressions for both Langmuir and Freundlich, respectively.

$$q_e = \frac{q_m K_L C_e}{(1 + C_e K_L)} \quad (5)$$

$$q_e = K_F C_e^{1/n} \quad (6)$$

where $K_F$ is the adsorption capacity, n adsorption intensity, $q_m$ is the maximum adsorption capacity, $q_e$ is the equilibrium adsorption capacity, $C_e$, equilibrium concentration and $K_L$ is the Langmuir constant, also indicates intensity of adsorption.

When the results were plotted as $C_e/q_e$, vs $C_e$ for Langmuir (as shown in FIG. 16), and ln $q_e$ vs ln $C_e$ for Freundlich (as shown in FIG. 17), fitting parameters revealed that our data agreed satisfactorily well with the Freundlich isotherm. Also, the value of 1/n indicates a favorable adsorption and n indicates monolayer capacity. See J. Roh et al. and Y. S. Ho et al. This result shows that Boron is an effective dopant for activated carbon in adsorptive desulfurization.

Doping activated carbon with 1 wt. % of boron gave efficient and selective adsorbent for desulfurization of 4,6-dimethyldibenzothiophene. The employed characterization techniques revealed the structural, textural, and surface acidity properties, as well as morphology of the adsorbents. The doped boron metal facilitated better interaction between the adsorbent and adsorbate with fast uptake and efficient removal of the 4,6-dimethyldibenzothiophene. The 1BDAC sample showed 1 wt. % of boron loading improved surface acidity with minimal reduction textural parameters, which enabled its superior performance, compared to other studied adsorbents in the desulfurization process. Also, it showed maximum adsorption capacity of 8.64 mg/g at 100 ppmw-S and better selectivity for 4,6-dimethyldibenzothiophene in the presence of naphthalene, besides maintaining the good adsorption performance with only 7% loss after five regeneration cycles. The adsorption data obtained fitted well with Freundlich isotherm model and pseudo-second order kinetic model to describe the adsorption process of 4,6-dimethyldibenzothiophene onto the 1BDAC adsorbent.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of separating at least a portion of one or more sulfur compounds from a sulfur-containing mixture, the method comprising:
    contacting the sulfur-containing mixture with a sulfur adsorbent to form a treated mixture, wherein the sulfur adsorbent comprises boric acid deposited on an activated carbon support;
    wherein the sulfur adsorbent has at least one of the following properties,
    an average pore size of 1.0 to 10.0 nm,
    a BET surface area of 200 to 1,000 m$^2$/g,
    a specific total pore volume of 0.3 to 1.0 cm$^3$/g, or
    a surface acidity of 0.8 to 1.8 mmol/g.
2. The method of claim 1, wherein a weight ratio of the boric acid to the activated carbon support is in the range of 1:500 to 1:5.
3. The method of claim 1, wherein a weight ratio of the boric acid to the activated carbon support is in the range of 1:120 to 1:50.
4. The method of claim 1, wherein the activated carbon support has a BET surface area of 400 to 1,200 m$^2$/g.
5. The method of claim 1, wherein the boric acid is homogeneously deposited on the activated carbon support.
6. The method of claim 1, wherein an adsorption capacity of the sulfur adsorbent is up to 30.0 mg per gram of the sulfur adsorbent.
7. The method of claim 1, wherein a concentration of the one or more sulfur compounds in the sulfur-containing mixture ranges from 0.001% to 10% by weight relative to the total weight of the sulfur-containing mixture.
8. The method of claim 1,
    wherein the treated mixture comprises the one or more sulfur compounds, and
    wherein a ratio of a concentration of the one or more sulfur compounds in the treated mixture to the concentration of the one or more sulfur compounds in the sulfur-containing mixture is 1:2 to 1:1,000.
9. The method of claim 1, wherein the contacting is carried out at a temperature of 10° C. to 40° C.
10. The method of claim 1, wherein the sulfur-containing mixture is contacted with the sulfur adsorbent for at least 2 minutes, but no more than 6 hours.
11. The method of claim 1, further comprising:
    regenerating the sulfur adsorbent.
12. The method of claim 11,
    wherein the regenerating is carried out by treating the sulfur adsorbent with an organic solvent, and
    wherein the organic solvent is at least one selected from the group consisting of acetone, methanol, toluene, benzene, and xylene.
13. The method of claim 11,
    wherein the sulfur adsorbent is regenerated for up to ten times, and
    wherein an adsorption capacity of the sulfur adsorbent is reduced by no more than 10%, relative to an initial adsorption capacity of the sulfur adsorbent.
14. The method of claim 1,
    wherein the sulfur-containing mixture comprises one or more hydrocarbon compounds, and
    wherein a selectivity of the sulfur adsorbent towards adsorbing the one or more sulfur compounds is at least 90% by mole.
15. A method of separating at least a portion of one or more sulfur compounds from a sulfur-containing mixture, the method comprising:

contacting the sulfur-containing mixture with a sulfur adsorbent to form a treated mixture, wherein the sulfur adsorbent comprises boric acid deposited on an activated carbon support;

wherein the one or more sulfur compounds are selected from the group consisting of a sulfide, a disulfide, thiophene, an alkyl substituted thiophene, benzothiophene, an alkyl substituted benzothiophene, dibenzothiophene, and an alkyl substituted dibenzothiophene.

16. A sulfur adsorbent, comprising boric acid deposited on an activated carbon support, wherein a weight ratio of the boric acid to the activated carbon support is in the range of 1:200 to 1:5;

wherein the sulfur adsorbent has at least one of the following properties, an average pore size of 1.0 to 10.0 nm, a BET surface area of 200 to 1,000 $m^2/g$, a specific total pore volume of 0.3 to 1.0 $cm^3/g$, or a surface acidity of 0.5 to 1.8 mmol/g.

17. The sulfur adsorbent of claim 16, wherein a weight ratio of the boric acid to the activated carbon support is in the range of 1:120 to 1:50.

18. The sulfur adsorbent of claim 16, wherein the boric acid is homogeneously deposited on the activated carbon support.

* * * * *